(12) United States Patent
Yoshimura et al.

(10) Patent No.: US 7,003,769 B1
(45) Date of Patent: Feb. 21, 2006

(54) SYSTEM DIAGNOSIS APPARATUS, SYSTEM DIAGNOSIS METHOD AND COMPUTER-READABLE RECORDING MEDIUM RECORDING SYSTEM DIAGNOSIS PROGRAM

(75) Inventors: Ken Yoshimura, Kanagawa (JP);
Makoto Ikarashi, Kanagawa (JP);
Shoichi Satoh, Kanagawa (JP);
Toshiaki Nomura, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/496,069

(22) Filed: Feb. 1, 2000

(30) Foreign Application Priority Data
Aug. 31, 1999 (JP) .................................. 11-246520

(51) Int. Cl.
*G06F 9/46* (2006.01)

(52) U.S. Cl. ........................................ 718/100; 718/104
(58) Field of Classification Search ........ 709/100–108, 709/228; 395/182; 370/230, 235; 717/5; 710/107; 714/25, 31; 718/100–108, 1
See application file for complete search history.

(56) References Cited

U.S. PATENT DOCUMENTS

| 4,120,031 | A | * | 10/1978 | Kincheloe et al. ........... 705/412 |
| 4,922,514 | A | * | 5/1990 | Bergeron et al. ........ 379/29.01 |
| 5,220,668 | A | * | 6/1993 | Bullis .......................... 709/102 |
| 5,553,235 | A | * | 9/1996 | Chen et al. ................... 714/20 |
| 5,668,944 | A | * | 9/1997 | Berry ........................... 714/47 |
| 6,144,639 | A | * | 11/2000 | Zhao et al. ................. 370/235 |
| 6,170,083 | B1 | * | 1/2001 | Adl-Tabatabai ............. 717/158 |
| 6,222,822 | B1 | * | 4/2001 | Gerardin et al. ............ 370/230 |
| 6,341,371 | B1 | * | 1/2002 | Tandri ........................ 717/158 |
| 6,477,683 | B1 | * | 11/2002 | Killian et al. .................. 716/1 |

FOREIGN PATENT DOCUMENTS

JP 5151013 6/1993

* cited by examiner

*Primary Examiner*—Meng-Al T. An
*Assistant Examiner*—Kenneth Tang
(74) *Attorney, Agent, or Firm*—Greer, Burns & Crain, Ltd.

(57) ABSTRACT

A system diagnosis apparatus comprises a communication processing device which acquires a utility rate of the system resources of a user system and a queue for the system resources, a memory device stores thresholds of the utility rate and the queue. An analysis device is provided which decides that the performance of the system resource has lowered when the utility rate is more than its threshold and the queue is shorter than its threshold, or decides that the number of system resources is insufficient when the utility rate is more than its threshold and the queue is longer than its threshold.

7 Claims, 18 Drawing Sheets

$J_1$; SYSTEM PERFORMANCE INFORMATION

| | CPU UTILITY RATE (%) | EXECUTION QUEUE FOR CPU (PCS) | DISK UTILITY RATE (%) | DEMAND QUEUE FOR DISK | DISK RESPONSE TIME (ms) |
|---|---|---|---|---|---|
| 10:00:00 | 30 | 0 | 10 | 3 | 30 |
| 10:10:00 | 35 | 0 | 80 | 5 | 67 |
| 10:20:00 | 30 | 0 | 77 | 8 | 70 |
| 10:30:00 | 84 | 3 | 30 | 1 | 34 |
| 10:40:00 | 90 | 4 | 30 | 0 | 20 |
| 10:50:00 | 97 | 6 | 22 | 1 | 19 |
| …… | …… | …… | …… | …… | …… |
| 12:00:00 | 93 | 7 | 13 | 0 | 22 |
| 12:10:00 | 70 | 4 | 8 | 0 | 33 |
| AVERAGE | 84 | 3 | 43 | 1 | 32 |

CPU PERFORMANCE INFORMATION / DISK PERFORMANCE INFORMATION

FIG.6

T1: SYSTEM CONFIGURATION TABLE

| MACHINE ID | NO. OF MOUNTABLE CPUS | MOUNTED CPU INFORMATION | | | MOUNTED DISK INFORMATION | | | APPLICATION INFORMATION | CPU UPGRADE RECOMMEND INFORMATION | | DISK UPGRADE RECOMMEND INFORMATION | | CPU ORDER INFORMATION | | DISK ORDER INFORMATION | |
|---|---|---|---|---|---|---|---|---|---|---|---|---|---|---|---|---|
| | | CPU MODEL NAME | CPU PERFORMANCE (CLOCK FREQUENCY, MHZ) | NO. OF CPUS MOUNTED | DISK MODEL NAME | DISK PERFORMANCE (ROTATING SPEED, RPM) | NO. OF DISKS MOUNTED | | CPU MODEL NAME | NO. OF CPUS | DISK MODEL NAME | NO. OF DISKS | CPU MODEL NAME | NO. OF CPUS ORDERED | DISK MODEL NAME | NO. OF DISKS ORDERED |
| A | 2 | SPII | 233 | 1 | SG2 | 5500 | 1 | MAIL SERVER | | | SG2 | 2 | | | SG2 | 1 |
| B | 4 | PTT | 200 | 2 | AL2 | 7200 | 3 | PRINTER SERVER | PTT | 3 | | | PTT | 1 | | |
| C | 2 | ZZ2 | 400 | 2 | SGS | 10000 | 5 | JOB SERVER | ZZ3 | 2 | SGS | 7 | ZZ3 | 2 | SGS | 2 |
| D | 1 | AM2 | 133 | 1 | SG1 | 4500 | 2 | PERSONAL TERMINAL | PTT | 1 | AL2 | 1 | | | | |

FIG.7A

T₂; APPLICATION DEFINITION TABLE

| APPLICATION INFORMATION | UPGRADING FLAG |
|---|---|
| MAIL SERVER | 1 |
| PRINTER SERVER | 1 |
| FTP SERVER | 0 |
| JOB SERVER | 1 |
| PERSONAL TERMINAL | 0 |

FIG.7B

T₃; THRESHOLD TABLE

| No. | RESOURCE | PARAMETER | THRESHOLD |
|---|---|---|---|
| 1 | CPU | CPU UTILITY RATE | a (%) |
| 2 | CPU | LENGTH OF EXECUTION QUEUE FOR CPU | b (PCS) |
| 3 | DISK | DISK UTILITY RATE | x (%) |
| 4 | DISK | LENGTH OF DEMAND QUEUE FOR DISK | y (PCS) |
| 5 | DISK | DISK RESPONSE TIME | z (ms) |

FIG. 7C

T4; CPU LIST TABLE

| No. | CPU MODEL NAME | CPU PERFORMANCE (CLOCK FREQUENCY, MHz) |
|---|---|---|
| 1 | AM2 | 133 |
| 2 | PTT | 200 |
| 3 | SPII | 233 |
| 4 | ZZ1 | 300 |
| 5 | ZZ2 | 400 |
| 6 | ZZ3 | 500 |

FIG. 7D

T5; DISK LIST TABLE

| No. | DISK MODEL NAME | DISK PERFORMANCE (ROTATING SPEED, RPM) |
|---|---|---|
| 1 | SG1 | 4500 |
| 2 | SG2 | 5500 |
| 3 | AL2 | 7200 |
| 4 | SGS | 10000 |

FIG.13

TO ABC COMPANY

JUNE 25, 1999
F COMPANY

SYSTEM DIAGNOSIS REPORT

1. SYSTEM DIAGNOSIS SUBJECT

CUSTOMER NAME:

ABC COMPANY

DATA OF DIAGNOSIS:

JUNE 16, 1999; THURSDAY, 9:57 TO 18:07

HARDWARE

| COMPUTER NAME | GPSVR |
|---|---|
| MODEL NAME | DEF OF F COMPANY |
| CPU | ZZ2      400MHz×2 |
| MEMORY | 64MB |
| DISK | 5 UNITS |
| NETWORK | 100BASE-TX |

SOFTWARE

| OS | GHI |
|---|---|

FIG.15

3. PROBLEM AND TUNING ADVICE

| RESOURCE | PROBLEM | TUNING ADVICE |
|---|---|---|
| CPU | INCREASED CPU UTILITY RATE. | RECOMMEND TO INCREASE CLOCK SPEED OF CPU. CHANGE FROM PRESENT 400MHz×2 TO 500MHz×2. |
| MEMORY | ☺ | ☺ |
| DISK | DISK LOAD INCREASED DUE TO PAGING. | DISK LOAD CAN BE REDUCED BY ADDING TWO DISKS. |
| NETWORK | ☺ | ☺ |

[LEGEND]

| MARK | MEANING |
|---|---|
| ☺ | NO PROBLEM. |
| — | NOT DIAGNOSED THIS TIME. |

FOR INQUIRY ABOUT REPORT, CONTACT:
F COMPANY
PERSON IN CHARGE : YOSHIMURA OR NOMURA
TELEPHONE : ×××−×××−××××

FIG.16

100; ORDER CONFIRM SCREEN

ORDER NO.JJ1999080512

| | CPU MODEL NAME | QUANTITY |
|---|---|---|
| ■ | PTT | 1 |
| ☐ | ZZ3 | 2 |

| | DISK MODEL NAME | QUANTITY |
|---|---|---|
| ■ | SG2 | 1 |
| ☐ | SGS | 2 |

CONFIRM THE ORDER ? [ YES ] [ NO ]

101  102

SYSTEM DIAGNOSIS APPARATUS, SYSTEM DIAGNOSIS METHOD AND COMPUTER-READABLE RECORDING MEDIUM RECORDING SYSTEM DIAGNOSIS PROGRAM

FIELD OF THE INVENTION

The present invention relates to system diagnosis apparatus, system diagnosis method and computer-readable recording medium recording system diagnosis program.

BACKGROUND OF THE INVENTION

In a large enterprise organizing an information system department, the computer system is operated and managed by expert system engineers well versed in computer systems. In order to maintain the performance such as response and through-put at high level, performance diagnosis of resources composing the computer system such as central processing unit (CPU) and magnetic disk devices (called disks hereinafter) is executed as routine work during the management. If performance drop is found in any resource, the system engineers investigate the cause and properly upgrade that resource.

There are enterprises which can not employ exclusive system engineers because of limited budget. Such enterprises must consign operation and management of the computer system to another company that is specialized in the maintenance work (here after maintenance firm). In this case, therefore, the performance of resources is diagnosed regularly (or irregularly) by customer engineers dispatched from the maintenance firm.

In such operation management system, however, it is actually difficult to diagnose the performance in a thoroughly understanding state of the computer system of the specific enterprise and a customer engineer engaged in performance diagnosis may overlook the cause of performance drop of resources. Under this condition, even if the resource is upgraded, the performance does not improved and the quality of customer service may be lowered. Hitherto, therefore, there has been a keen desire for development of means and method of enhancing the quality of customer service without depending on the skill of the customer engineers engaged in the operation management tasks.

Conventionally, in operation and management of a system composed of computers, the manager judges the performance on the basis of the utility rate about the system resources (CPU, disks) that compose the system. When the utility rate exceeds a threshold, the manager judges that the performance of the system resource has lowered. In such as case, the deteriorated system resource is replaced by a new system resource of higher performance, or another system resource is added.

For example, if the case the system resource is the CPU, then the present CPU is replaced by a CPU having a higher frequency than the clock frequency of the present CPU. If the system resource is a disk, another disk is added.

Conventionally, as mentioned above, when the performance of the system resources (CPU, disks) is lowered, an attempt is made to avoid the drop of the performance by replacing the existing system resource with a system resource of a higher performance, or adding new system resources.

Generally, only when the cause of performance drop of the system resource is correctly investigated the performance of the system resource can be maintained above a specified level. The conditions that lower the performance of the CPU, for example, include high utility rate and long queue waiting for execution of a process. If these are the causes, then it is effective to install an additional CPU. On the other hand, if a high utility rate is the only cause, then it is effective to replace the existing CPU with a better CPU.

The conditions that lower the disk performance include high utility rate, long queue waiting for read/write demand and long response time. If these are the causes, it is effective to install additional disks. On the other hand, if high utility rate and response time are the only causes, then it is effective to replace the existing disk with a better disk.

However, in order to judge the cause of performance drop of system resources, the engineers are required to have a thorough knowledge of the system under investigation. For the enterprise having the performance of system resources diagnosed regularly (or irregularly) by the customer engineers dispatched from the maintenance firm, in reality, it is very difficult to diagnose the performance in a state of full understanding of the computer system of the specific enterprise.

Therefore, the customer engineer responsible for performance diagnosis may overlook the cause of performance drop of system resources. In such a case, even if the system resource is upgraded, the performance is not improved so much. Regarding the CPU, for example, supposing the queue waiting for execution of process is one of the causes that generate the drop in the performance, even if the CPU is replaced with a better CPU, the performance of the CPU is not improved so much. Similarly, in the case of the disk, even if disks are added although the utility rate and response time are the causes that generate the drop in the performance, the disk performance is not improved so much.

Thus, in the event of wrong judgement of cause of performance drop of system resources, not only the quality of the customer service is lowered, but also it is accompanied by wasteful extra steps such as redoing of diagnosis and follow-up of the user by the sales staff.

Moreover, when upgrading the system resources, the system resources are ordered manually. This may cause ordering errors due to human interaction, or may take time in the ordering process.

The present invention is achieved in the light of the aforesaid problems. It is an object of this invention to provide a system diagnosis apparatus, a system diagnosis method and a computer-readable recording medium recording system diagnosis program, capable of determining measures against drop or shortage of performance of system resources and ordering necessary system resources accurately and promptly.

SUMMARY OF THE INVENTION

The present invention is achieved in the light of the aforesaid problems. It is an object of this invention to provide a system diagnosis apparatus, a system diagnosis method and a computer-readable recording medium recording system diagnosis program, capable of determining measures against drop or shortage of performance of system resources and ordering necessary system resources accurately and promptly.

According to one aspect of this invention, in the system diagnosis apparatus, when the utility rate of the system resource is greater than its threshold and the queue is shorter than its threshold, a diagnosis unit diagnoses that the performance of the user system resource has lowered. In this case, the existing system resource is replaced by a system resource of higher performance than this system resource. On the other hand, when the utility rate is greater than its threshold and the queue is longer than its threshold, the diagnosis unit diagnoses that the number of system resources is insufficient. In this case, system resources are added to cover up for the shortage. Thus, the system resources are diagnosed on the basis of the results of comparison between the utility rate and its threshold and between the queue and its threshold.

Further, a system resource determining unit which determines the system resource to be upgraded when the diagnosis unit diagnoses that the performance of the system resource has lowered is provided. Further, an ordering unit makes an order of the determined system resource. On the other hand, when it is diagnosed by the system diagnosis unit that the number of system resources is insufficient, the number of system resources capable of exhibiting the specified performance is determined by the system resource determining unit. In this case, the system sources to cover up for the shortage are ordered by the ordering unit. Thus, the system resources for upgrading are ordered by the ordering unit on the basis of the result of determination by the system resource determining unit.

Further, an ordering unit directly transmits the ordering information about the system resources for updating to the device of the supplier's side through the network.

Further, the result of diagnosis by the diagnosis unit is noticed to the user through the network.

Further, out of the system resources determined by the system resource determining unit only the system resources required to be updated are ordered as the system resources for upgrading on the basis of the flag.

Further, the system resources are diagnosed on the basis of the results of comparison between the queue and its threshold, and further comparison between the response time and its threshold.

According to another aspect of this invention, in the system diagnosis method, when the utility rate of the system resource is greater than its threshold and the queue is shorter than its threshold, a diagnosis unit diagnoses that the performance of the user system resource has lowered. In this case, the existing system resource is replaced by a system resource of higher performance than this system resource. On the other hand, when the utility rate is greater than its threshold and the queue is longer than its threshold, the diagnosis unit diagnoses that the number of system resources is insufficient. In this case, system resources are added to cover up for the shortage. Thus, the system resources are diagnosed on the basis of the results of comparison between the utility rate and its threshold and between the queue and its threshold.

According to still another aspect of this invention, the program for executing the system diagnosis method is stored on a recording medium. This program can be easily read on a computer and the system diagnosis method can be easily executed using the computer.

Other objects and features of this invention will become apparent from the following description with reference to the accompanying drawings.

BRIEF DESCRIPTION OF THE DRAWINGS

FIG. 6 is a diagram showing a system configuration table $T_1$ shown in FIG. 4;

FIG. 7A to FIG. 7D are the tables shown in FIG. 4;

FIG. 13 is a diagram showing an example of system diagnosis report in this embodiment;

FIG. 15 is a diagram showing an example of system diagnosis report in this embodiment;

FIG. 16 is a diagram showing an example of order confirm screen 100 in this embodiment.

DESCRIPTION OF THE PREFERRED EMBODIMENTS

Figure 1:
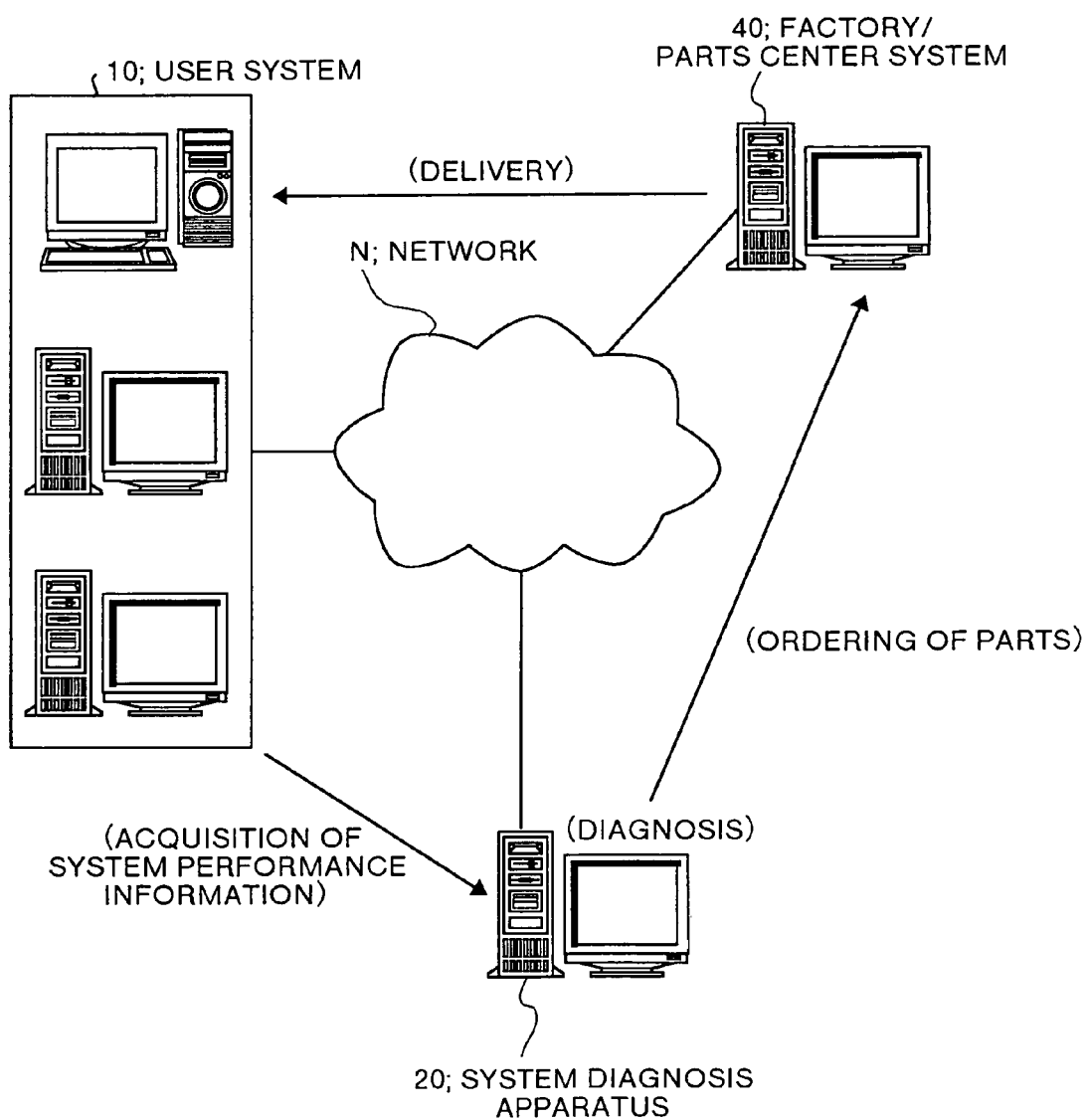
FIG. 1 is a diagram showing a schematic constitution in an embodiment of the present invention.

Referring now to the drawings, the system diagnosis apparatus, system diagnosis method and computer-readable recording medium recording system diagnosis program of the present invention are described in detail below.

FIG. 1 is a diagram showing a schematic constitution of the embodiment of this invention. As show in this figure, a user system 10 is installed at the user side and is composed of mail server, printer server, job server and many (or only one) computers as personal terminals. Hereinafter, the mail server, printer server and others are collectively called the user system 10 and the user system 10 is supposed to be composed of four computers in total, that is, mail server, printer server, job server and personal terminal. This user system 10 is composed of system resources such as CPU, disks and memories. Actually, the system resources are present in each one of the mail server, printer server, job server and personal terminal.

The user system 10 includes a function of storing the performance information of system resources in operation (hereinafter called system performance information) in a not shown memory unit and issuing the system performance information to outside when a necessary command is input. The system performance information includes the CPU utility rate, length of execution queue for CPU, disk utility rate, length of demand queue for disk, disk response time and others.

Figure 2A:
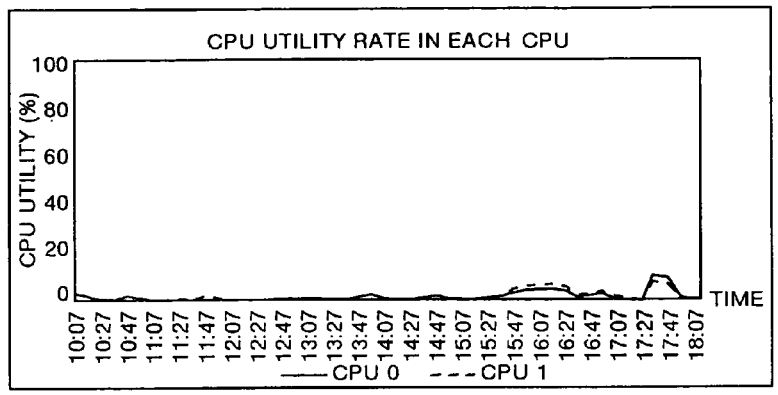
FIG. 2A to FIG. 2C are diagrams showing the examples of the CPU utility rate in a user system 10 shown in FIG. 1 and FIG. 4.
Figure 2B:
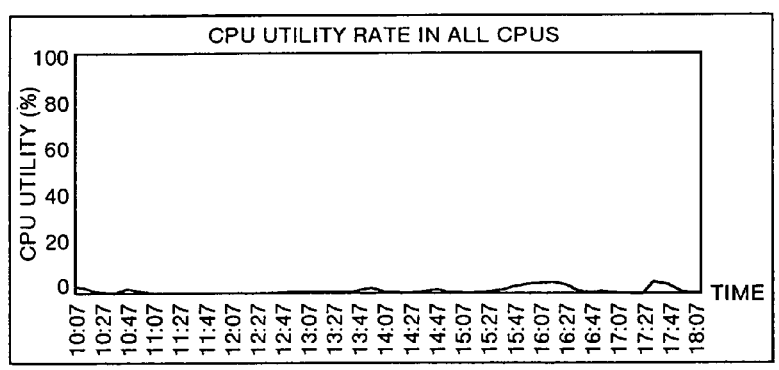
Figure 2C:
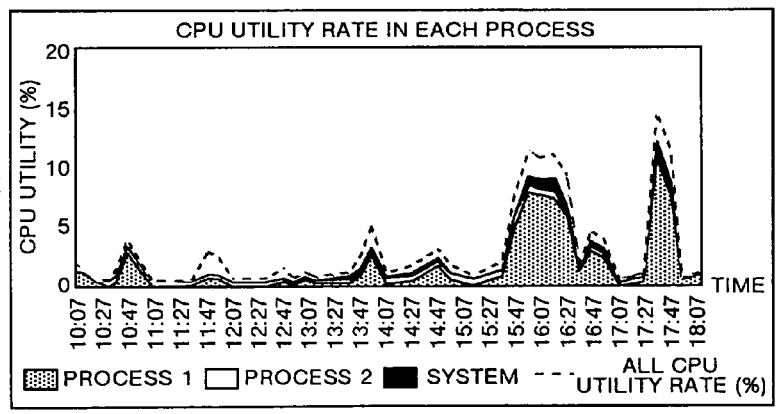

The CPU utility rate is the ratio of run time of the CPU executing the program to the measuring time required for measurement of the CPU utility rate (run time/measuring time). For example, of the measuring time of 10 minutes, if the run time is 3 minutes and 30 seconds, the CPU utility rate is 35%. FIG. 2A to FIG. 2C are diagrams showing examples of time sequence changes of the CPU utility rate in the user system 10. In FIG. 2A to FIG. 2C, the axis of abscissas is the time axis having a range from 10:07 to 18:07 and the axis of ordinates represents the CPU utility rate.

FIG. 2A shows the changes of the CPU utility rate of two CPU, CPU 0 and CPU 1. FIG. 2B shows the CPU utility rate of all the CPUs (in this case, CPU 0 and CPU 1). FIG. 2C shows the CPU utility rate occupied by process 1, process 2 and the system (operating system).

The execution queue number is the number of other programs that form a queue while the CPU is executing one program. In other words, the execution queue is the number of other processes waiting for execution while one process is occupying the CPU.

Figure 3A:
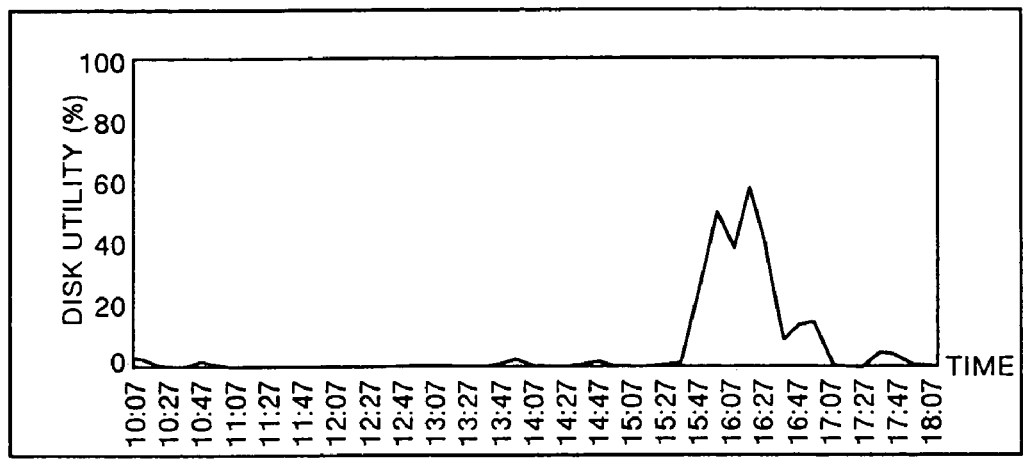
FIG. 3A and FIG. 3B are diagrams showing the examples of the disk utility rate and disk response time in the user system 10 shown in FIG. 1 and FIG. 4.

The disk utility rate is the ratio of the operating time required for read/write operation to the measuring time required for measuring the disk utility rate (operating time/ measuring time). For example, of the measuring time of 10 minutes, when the operating time is 2 minutes, the disk utility rate is 20%. FIG. 3A shows an example of time sequence changes of disk utility rate in the user system 10. In FIG. 3A, the axis of abscissas is the time axis having a range from 10:07 to 18:07 and the axis of ordinates represents the disk utility rate.

Figure 3B:
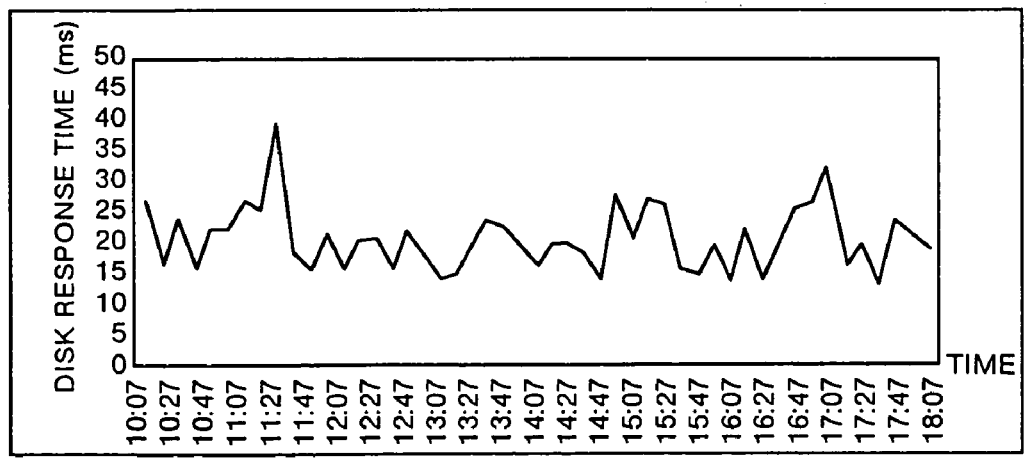

The demand queue number is the number of other read/ write demands that form a queue while the disk is executing read/write operation. The disk response time is the time from issue of read/write demand to the disk until end of read/write operation. FIG. 3B shows an example of time sequence changes of disk response time in the user system 10. In FIG. 3B, the axis of abscissas is the time axis having a range from 10:07 to 18:07 and the axis of ordinates represents the disk response time.

Returning to FIG. 1, the user system 10 is connected to a network N such as the Internet or other exclusive line and has a communication function for communicating with a system diagnosis apparatus 20 installed at an external maintenance firm. The user system 10 also has a function of issuing the system performance information stored in the memory unit to the outside, when a necessary command is entered through the local operation or remote operation. The system performance information may be output to a recording medium such as the floppy disk or the optical disk or it may be output to the system diagnosis apparatus 20 through the network N.

The system diagnosis apparatus 20 includes an acquisition function of acquiring system performance information from the user system 10 through a recording medium or the network N. Further, the system diagnosis apparatus 20 includes a diagnosis function of diagnosing the performance of system resources by analyzing the system performance information. Further, the system diagnosis apparatus 20 also includes a reporting function of reporting the diagnosis result to the user and an ordering function of ordering parts (system resources) if upgrading of system resources is necessary on the basis of the diagnosis result.

The system diagnosis apparatus 20 is connected to the user system 10 and a factory/parts center system 40 through the network N. Therefore, the system diagnosis apparatus 20 accesses the user system 10 through the network N when acquiring the system performance information and when reporting the diagnosis result. Further, the system diagnosis apparatus 20 accesses the factory/parts center system 40 through the network N when ordering the parts.

The factory/parts center system 40 is a computer, which is installed at the manufacturing factory of the user system 10 or the parts center having a stock of upgrading parts (system resources: CPU, disk, etc.) about the user system 10.

The factory/parts center system 40 includes a communication function for communicating with the system diagnosis apparatus 20 through the network N and an ordering control function for controlling order of parts. The worker at the manufacturing factory/parts center delivers the requested parts to the user according to the ordering management of the factory/parts center system 40.

Figure 4:
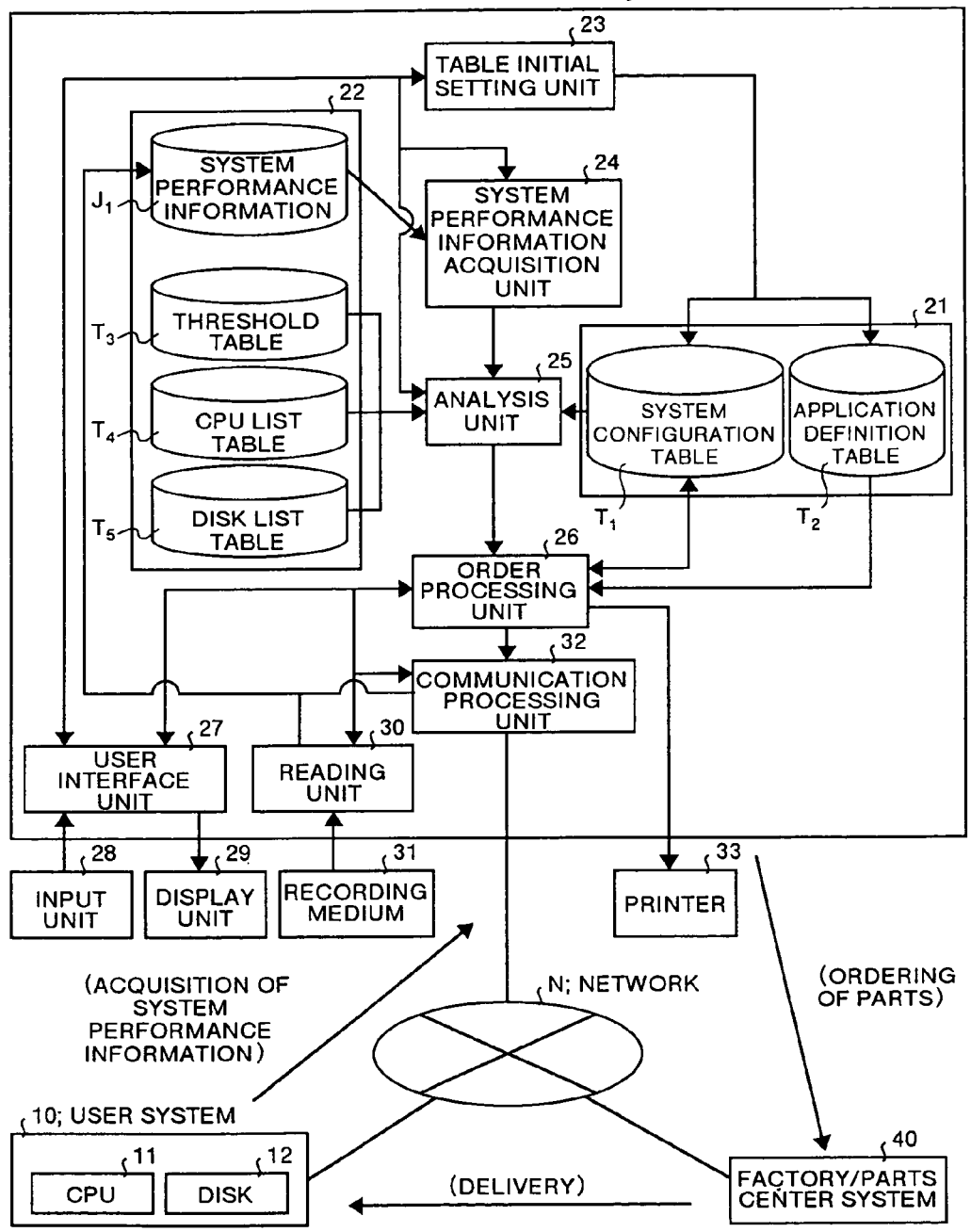
FIG. 4 is a block diagram showing a constitution of this embodiment.

Referring next to FIG. 4, the constitution of this embodiment will be described in detail. In FIG. 4, the sections that perform the similar functions as those in FIG. 1 have been provided with the same reference numerals. In the user system 10 shown in FIG. 4, CPU 11 and disk 12 are system resources that make the user system 10 and are also the objects of diagnosis of the performance. Actually, many (or only one) CPUs and/or disks are provided for each computer of the user system 10.

In the system diagnosis apparatus 20, a system configuration table $T_1$ and an application definition table $T_2$ are stored in the memory unit 21. The system configuration table $T_1$ is, as shown in FIG. 6, a table composed of the specification of system resources in the user system 10, application of computer system for composing the user system 10, information about upgrading of system resources and information about ordering of system resources.

That is, the system configuration table $T_1$ is composed of machine ID, mounted CPU information, mounted disk information, application information, CPU upgrade recommended information, disk upgrade recommended information, CPU order information and disk order information.

Among these pieces of information, the machine ID, mounted CPU information, mounted disk information and application information are individually set in the table initial setting unit 23 mentioned below before diagnosing about the user system 10. The CPU upgrade recommended information and disk upgrade recommended information are set after diagnosis about the user system 10. The CPU order information and disk order information are set when ordering the parts (system resources) to the factory/parts center system 40.

The machine ID is an identifier individually given to a total of four computers that make the user system 10 and in the illustrated example, the machine ID is A, B, C and D.

The mounted CPU information is the information about the specification of the CPU (system resources) mounted on each one of the four computers that make the user system 10. More specifically, the mounted CPU information is composed of the number of mountable CPUs showing the maximum number of CPUs that can be mounted on that particular computer, the CPU model name showing the model name of the CPU actually mounted on the computer, the CPU performance showing the clock frequency of the CPU actually mounted on the computer and the number of CPU mounted showing the number of CPUs actually mounted on the computer.

For example, in the computer having the machine ID and A, the number of mountable CPUs is 2, the CPU model name is SPII, the CPU performance is 233 and the number of CPUs still mountable is 1. Therefore, in this computer, as the number of mountable CPUs is 2 and CPU quantity is 1, there is a room for one more CPU.

The mounted disk information is the information about the specification of the disks (system resources) mounted on each one of the four computers that make the user system 10. More specifically, the mounted disk information is composed of the disk model name showing the model name of the disk actually mounted on the computer, the disk performance showing the rotating speed of the magnetic disk incorporated in the disk and the number of disks mounted showing the number of disks that are actually mounted on that particular computer.

For example, in the computer having the machine ID of A, the disk model name is SG2, the disk performance is 5500 and the number of disks mounted is 1. Similarly, in the computer having the machine ID of B, the disk model name is AL2, the disk performance is 7200 and the number of mounted disks is 3.

The application information is the information showing the applications of the four computers for composing the user system 10. More specifically, the computer having the machine ID of A is used as a mail server and the computer having the machine ID of B is used as a printer server. Similarly, the computer having the machine ID of C is used as a job server and the computer having the machine ID of D is used as a personal terminal.

The CPU upgrade recommended information is the information about the CPU recommended to be upgraded by the maintenance firm of the user system 10. The upgrading techniques of the CPU include a technique of adding (extending) a new CPU and a technique of replacing the existing CPU with a CPU having a higher performance.

In the case of the former technique, a CPU having a same clock frequency as the clock frequency of the existing CPU is newly added. This technique is effective for enhancing the through-put. On the other hand, in the case of the latter technique, the existing CPU is replaced by a CPU having a higher clock frequency than the clock frequency of the existing CPU. This technique is effective for enhancing the response time (processing time).

More specifically, the CPU upgrade recommended information is composed of the CPU model name and number of CPUs. The CPU model name is the model name of the CPU recommended to be upgraded by the maintenance firm and the number of CPUs is the number of CPUs that are required to be upgraded.

What is of note here is that when the CPU model name of the CPU upgrade recommended information and the CPU model name of the mounted CPU information are identical, the former CPU model name shows the model name of the CPU recommended to be added by the maintenance firm. In this case, moreover, the number of CPUs in the CPU upgrade recommended information shows the sum of the number of CPUs already mounted and the number of CPUs recommended to be added by the maintenance firm.

On the other hand, when the CPU model name of the CPU upgrade recommended information and the CPU model name of the mounted CPU information are different, the former CPU model name shows the model name of the CPU in the case of recommendation for upgrading by replacing the existing CPU with a CPU having a higher clock frequency. In this case, the number of CPUs in the CPU upgrade recommended information represents the number of CPUs recommended to be replaced by the maintenance firm.

The disk upgrade recommended information is the information about the disk recommended to be upgraded by the maintenance firm of the user system 10. Herein, the upgrading techniques of the disk include a technique of adding (extending) a new disk and a technique of replacing the existing disk with a disk of a higher performance.

In the case of the former technique, a disk having a same rotating speed as the rotating speed of the existing disk is newly added. This technique is effective for enhancing the through-put. On the other hand, in the case of the latter technique, the existing disk is replaced by a disk having a higher rotating speed than the rotating speed of the existing disk. This technique is effective for enhancing the response time (processing time).

More specifically, the disk upgrade recommended information is composed of the disk model name and number of disks. The disk model name is the model name of the disk recommended to be upgraded by the maintenance firm and the number of disks is the number of disks required to be upgraded. What is of note here is that when the disk model name of the disk upgrade recommended information and the disk model name of the mounted disk information are identical, the former disk model name shows the model name of the disk recommended to be added by the maintenance firm. In this case, moreover, the number of disks in the disk upgrade recommended information represents the sum of the number of disks already mounted and the number of disks recommended to be added by the maintenance firm.

On the other hand, when the disk model name of the disk upgrade recommended information and the disk model name of the mounted disk information are different, the former disk model name shows the model name of the disk in the case of recommendation for upgrading by replacing the existing disk with a disk of higher rotating speed. In this case, the number of disks in the disk upgrade recommended information shows the number of disks recommended to be replaced.

The CPU order information is the information about ordering of CPU for upgrading and is composed of CPU model name and number of CPUs ordered. The CPU model name shows the model name of the CPU to be ordered, which corresponds to the CPU model name in the CPU upgrade recommended information. The number of CPUs ordered is the number of CPUs to be ordered to the factory. In the computer having the machine ID of C, the CPU model name is ZZ3 and the number of CPUs ordered is 2.

Herein, if the CPU model name of the CPU order information and the CPU model name of the mounted CPU information are different, the number of CPUs ordered and number of CPUs mounted are identical. If they are identical, the number of CPUs ordered is the balance of subtraction of the number of CPUs ordered of the mounted CPU information from the number of CPUs of the CPU upgrade recommended information.

The disk order information is the information about ordering of disk for upgrading and is composed of disk model name and number of disks ordered. The disk model name shows the model name of the disk to be ordered, which corresponds to the disk model name in the disk upgrade recommended information. The number of disks ordered is the number of disks to be ordered to the factory.

Herein, if the disk model name of the disk order information and the disk model name of the mounted disk information are different, the number of disks ordered and number of disks mounted are identical. If they are identical, the number of disks ordered is the balance of subtraction of the number of disks mounted of the mounted disk information from the number of disks of the disk upgrade recommended information.

Returning to FIG. 4, the application definition table $T_2$ is a table that defines the application of the plurality of computers as the object of diagnosis by the system diagnosis apparatus 20 and necessity of upgrading corresponding thereto. More specifically, as shown in FIG. 7A, the application definition table $T_2$ is composed of application information and upgrading flag. The application information includes the mail server, printer server, FTP (file transfer process) server, job server and personal terminal.

The upgrading flag is a flag showing whether it is necessary to upgrade the system resources (CPU, disk, etc.) that make the computer. More specifically, the upgrading flag 1 shows it is necessary to upgrade according to the result of diagnosis when it is diagnosed necessary to upgrade the system resources for composing the computer. On the other hand, the upgrading flag 0 shows it is not necessary to upgrade, regardless of the result of diagnosis even if it is diagnosed necessary to update.

In other words, the upgrading flag expresses the review result of cost effect of upgrading. That is, the upgrading flag is 1 (upgrading necessary) for the mail server, printer server and job server (see FIG. 7A) which are regarded to be high in importance by the user.

On the contrary, in the FTP server and personal terminal which are regarded to be low in importance by the user, the upgrading flag is 0 (upgrading not necessary). Since the standard about necessity of upgrading varies depending upon the user, the application definition table $T_2$ is set separately for each user.

Returning to FIG. 4, in the memory unit 22, the system performance information $J_1$, threshold table $T_3$, CPU list table $T_4$ and disk list table $T_5$ are stored. The system performance information $J_1$ is the performance information (CPU utility rate, disk utility rate, etc.) of system resources (CPU, disk) in operation of the user system 10 and is acquired from the user system 10 through the network N or the recording medium 31. This recording medium 31 is for recording the system performance information stored in the memory unit of the user system 10 and is a floppy disk, optical disk or the like.

Figure 5:
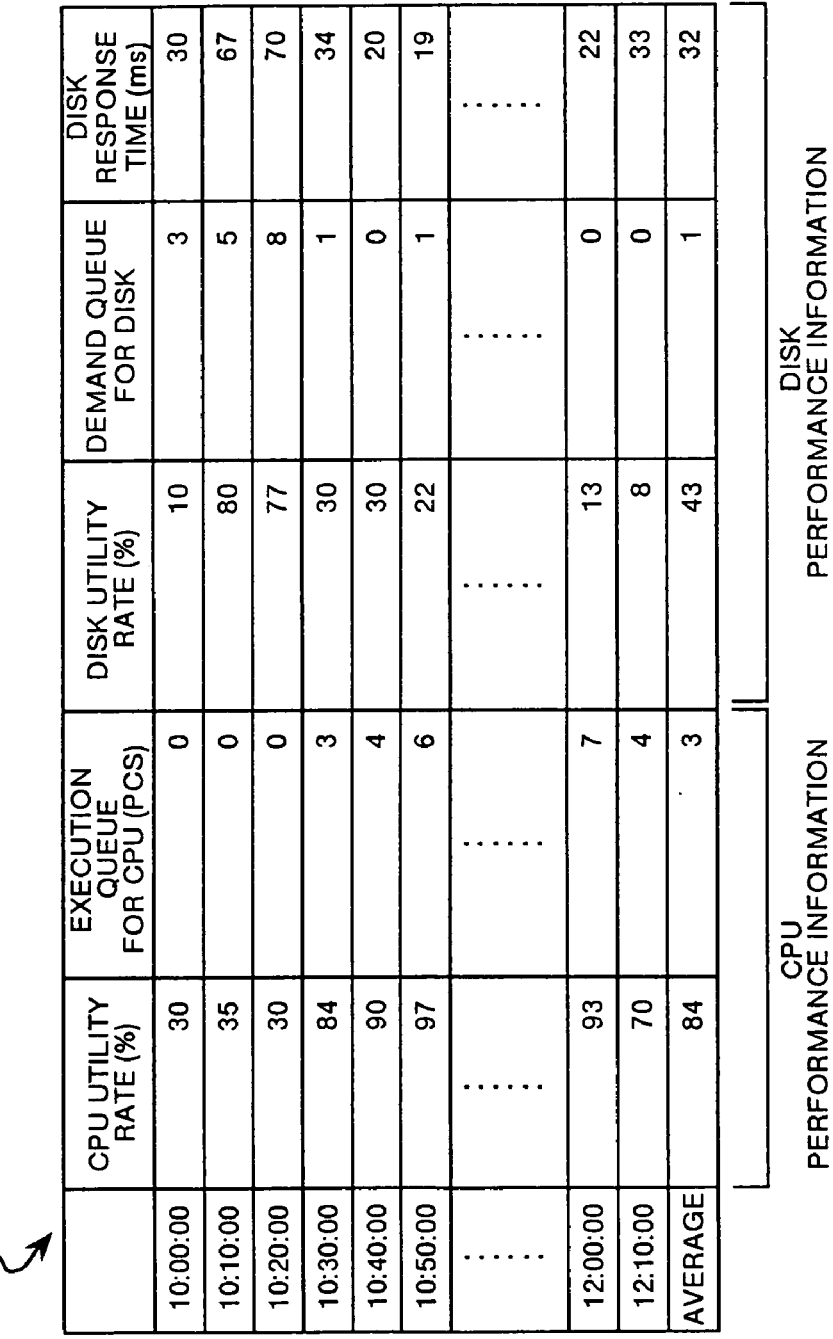
FIG. 5 is a diagram showing system performance information $J_1$ shown in FIG. 4.

More specifically, the system performance information $J_1$, as shown in FIG. 5, is composed of the measured data and average of the aforesaid CPU utility rate, execution queue for the CPU, disk utility rate, demand queue for the disk and disk response time. The CPU utility rate and execution queue for the CPU are the CPU performance information for analyzing the performance of the CPU. The disk utility rate, demand queue for the disk and disk response time are the disk performance information for analyzing the performance of the disk.

In the example shown in FIG. 5, the system performance information $J_1$ is composed of the data measured in the time zone from 10:00:00 to 12:00:00. Although not shown in FIG. 5, the system performance information $J_1$ also includes measured data in other time zones and their average.

Returning to FIG. 4, the threshold table $T_3$ is composed of the plurality of threshold values used in diagnosis of system resources (CPU, disk) of the user system 10. Specifically, as shown in FIG. 7B, the threshold table $T_3$ consists of items for No., resource, parameter and threshold. The parameters and the thresholds used in the evaluation of the performance of the CPU and the disk are stored in the correlation form.

That is, concerning the CPU, threshold values of CPU utility rate and execution queue for the CPU are set in "a" and "b". Similarly, concerning the disk, threshold values of disk utility rate, demand queue for the disk and disk response time are set in "x", "y" and "z". These threshold values (a, b, x, y, z) are determined on the basis of the maintenance know-how of the maintenance firm.

Returning to FIG. 4, the CPU list table $T_4$ is a table showing a list of the plurality of CPUs applicable as system resources of the user system 10. That is, as shown in FIG. 7C, the CPU list table $T_4$ is composed of No., CPU model name and CPU performance (clock frequency). The disk list table $T_5$ is a table showing a list of the plurality of disks applicable as system resources of the user system 10 and is composed of No., disk model name and disk performance as shown in FIG. 7D.

Returning to FIG. 4, the table initial setting unit 23 is responsible for initial setting of the system configuration table $T_1$ and application definition table $T_2$. The system information acquisition unit 24 acquires the system performance information $J_1$ (see FIG. 5) from the memory unit 22 at the time of diagnosis and transfers it to the analysis unit 25. The analysis unit 25 analyzes the system performance information $J_1$ by referring to the system configuration table $T_1$, threshold table $T_3$, CPU list table $T_4$ and disk list table $T_5$ and transfers the result of analysis to the order processing unit 26. This analysis result represents the necessity or not of upgrading of system resources. The detail of method of analysis in the analysis unit 25 is described later.

The order processing unit 26 makes orders for system resources and compiles the system diagnosis report (see FIG. 13 to FIG. 15) on the basis of the result of analysis of the analysis unit 25. This system diagnosis report represents the result of diagnosis of the performance of system resources of the user system 10 and is presented to the user of the user system 10 after the diagnosis. The detail of this system diagnosis report is described later.

The user interface unit 27 works as an interface between different sections such as the input unit 28 and the display unit 29. The input unit 28 is the input device such as keyboard and mouse. The display unit 29 is the cathode-ray tube (CRT) or liquid crystal display (LCD) and displays information necessary for diagnosis or ordering. Reading unit 30 reads the information recorded in the recording medium 31 (in this case, system performance information $J_1$) and stores it in the memory unit 22. The communication processing unit 32 communicates between the user system 10 and the factory/parts center system 40 through the network N according to the prescribed protocol. The printer 33 prints out the system diagnosis report (see FIG. 13 to FIG. 15) as required.

The operation according to this embodiment is explained below while referring to the flowcharts shown in FIG. 8 to FIG. 12. First, the person in charge at the maintenance firm initially sets the system configuration table $T_1$ and application definition table $T_2$ before starting diagnosis of the user system 10. That is, the person in charge enters, concerning the user system 10, the information of machine ID, mounted CPU information, mounted disk information and application information shown in FIG. 6 using the input unit 28.

As a result, the information is stored in the table initial setting unit 23 through the user interface unit 27. The table initial setting unit 23 sets the information of machine ID, mounted CPU information, mounted disk information and application information in the system configuration table $T_1$ as shown in FIG. 6.

Next, the person in charge enters, concerning the user system 10, the application information and the upgrading flag shown in FIG. 7A using the input unit 28. Herein, the upgrading flag is entered on the basis of the result of necessity of upgrading confirmed beforehand by the user of the user system 10. The information is stored in the table initial setting unit 23 through the user interface unit 27 and is set in the application definition table $T_2$ (see FIG. 7A) through the table initial setting unit 23.

In operation, the user system 10 shown in FIG. 4 records the system performance information about system resources (CPU 11, disk 12) along the time sequence and stores it in a not shown memory unit. Herein, the system performance information includes, as mentioned above, the CPU utility rate (see FIG. 2A to FIG. 2C), execution queue for the CPU, disk utility rate (see FIG. 3A), demand queue for the disk and the disk response time (see FIG. 3B). Thus, in the user system 10, the system performance information is recorded as log in a not shown memory unit.

When diagnosing the system resources of the user system 10 on the basis of the system performance information, by the following first method or second method, the system performance information is acquired in the system diagnosis apparatus 20 from a not shown memory unit of the user system 10. That is, the first method is a method of acquiring the system performance information through the recording medium 31 and the second method is a method of acquiring the system performance information through the network N.

In the case of the first method, when a specific command is entered with the recording medium 31 being inserted into a not shown disk drive of the user system 10, the system performance information is readout from a not shown memory unit and recorded in the recording medium 31. When this recording medium 31 is brought into the maintenance firm, the person in charge at the maintenance firm inserts the recording medium 31 into the reading unit 30 and enters a specific command using the input unit 28.

As a result, the reading unit 30 reads, for example, system performance information $J_1$ shown in FIG. 5 from the recording medium 31 and stores it in the memory unit 22. FIG. 5 shows the information about one computer out of four computers that make the user system 10. Actually, the system performance information $J_1$ includes the information of all of the four computers.

In the case of the second method, when a specific command is entered using the input unit 28 by the person in charge at the maintenance firm, the communication processing unit 32 accesses the user system 10 through the network N and requests downloading of system performance information to the user system 10.

As a result, the user system 10 reads out the system performance information stored in a not shown memory unit and transmits it to the communication processing unit 32 of the system diagnosis apparatus 20 through the network N. The communication processing unit 32, after receiving the system performance information from the user system 10, stores the result of reception as system performance information $J_1$ (see FIG. 5) in the memory unit 22.

Figure 8:
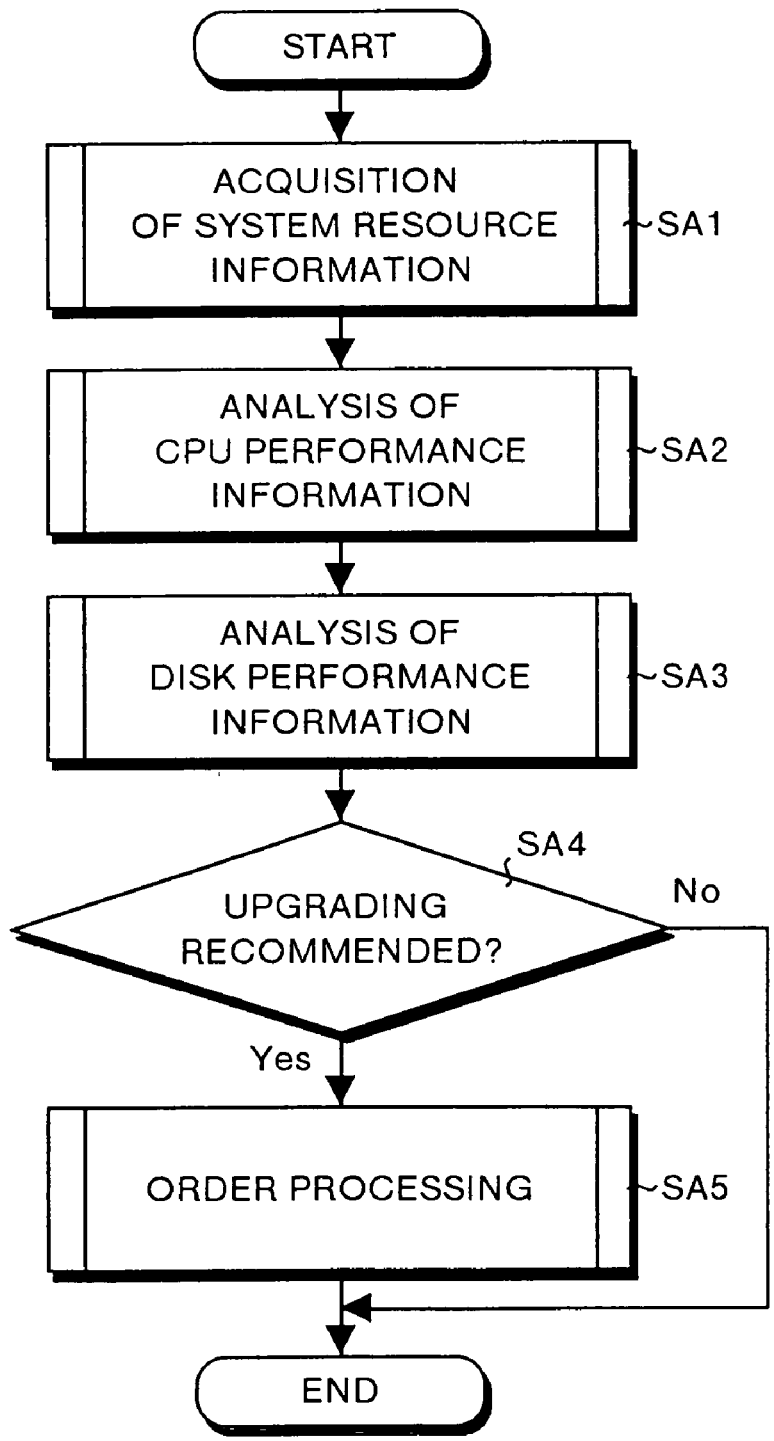
FIG. 8 is a flowchart for explaining the operation of this embodiment.
Figure 9:
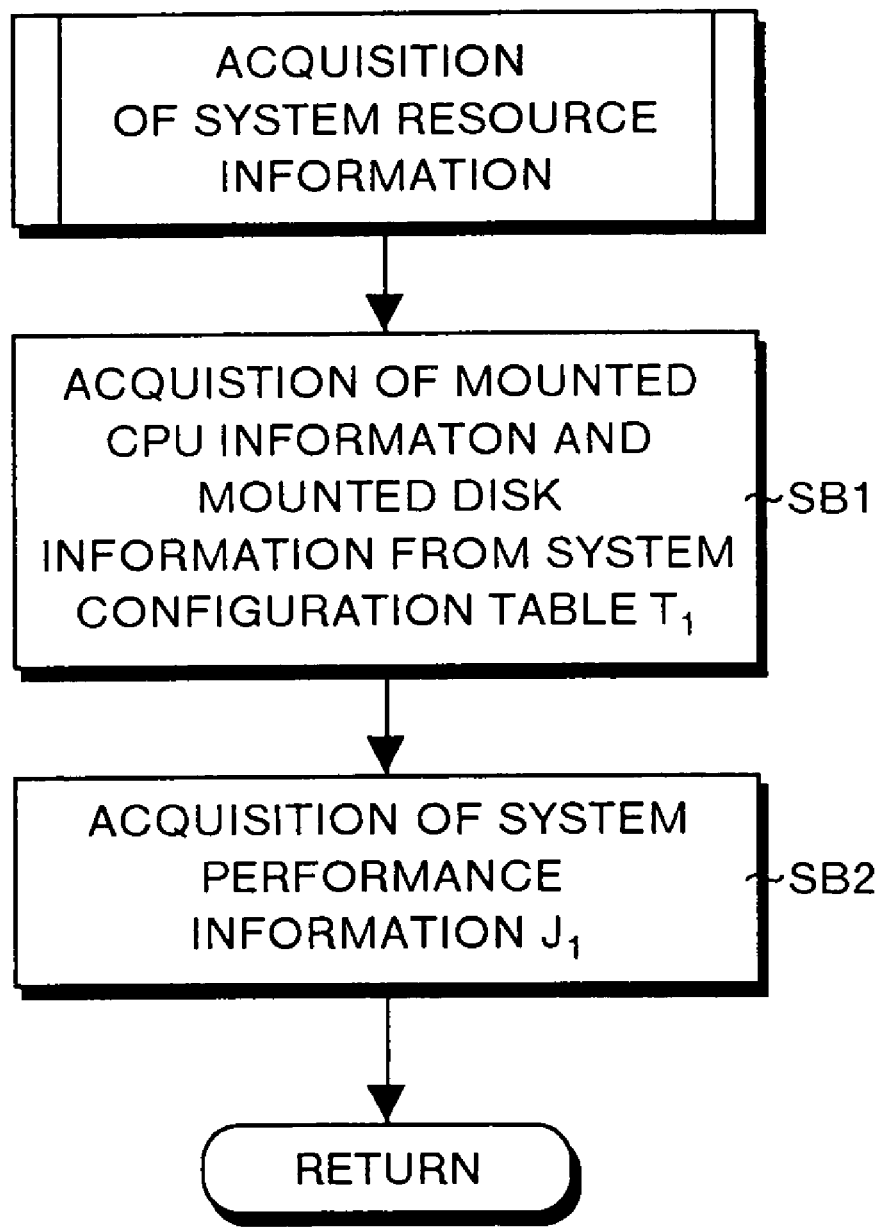
FIG. 9 is a flowchart for explaining the acquisition process of system resource information shown in FIG. 8.

Under the condition that the system performance information $J_1$ is stored in the memory unit 22, when a command instructing the diagnosis is entered using the input unit 28, the analysis unit 25 and system performance information acquisition unit 24 perform the process in step SA1 shown in FIG. 8 and execute system performance information acquisition process (see FIG. 9).

That is, at SB1 shown in FIG. 9, the analysis unit 25 accesses the memory unit 21 and acquires the mounted CPU information and mounted disk information from the system configuration table $T_1$ (see FIG. 6). Consequently, at step SB2, the system performance information acquisition unit 24 accesses the memory unit 22 and acquires the system performance information $J_1$ shown in FIG. 5 and transfers it to the analysis unit 25, thereby returning to the main routine shown in FIG. 8.

Figure 10:
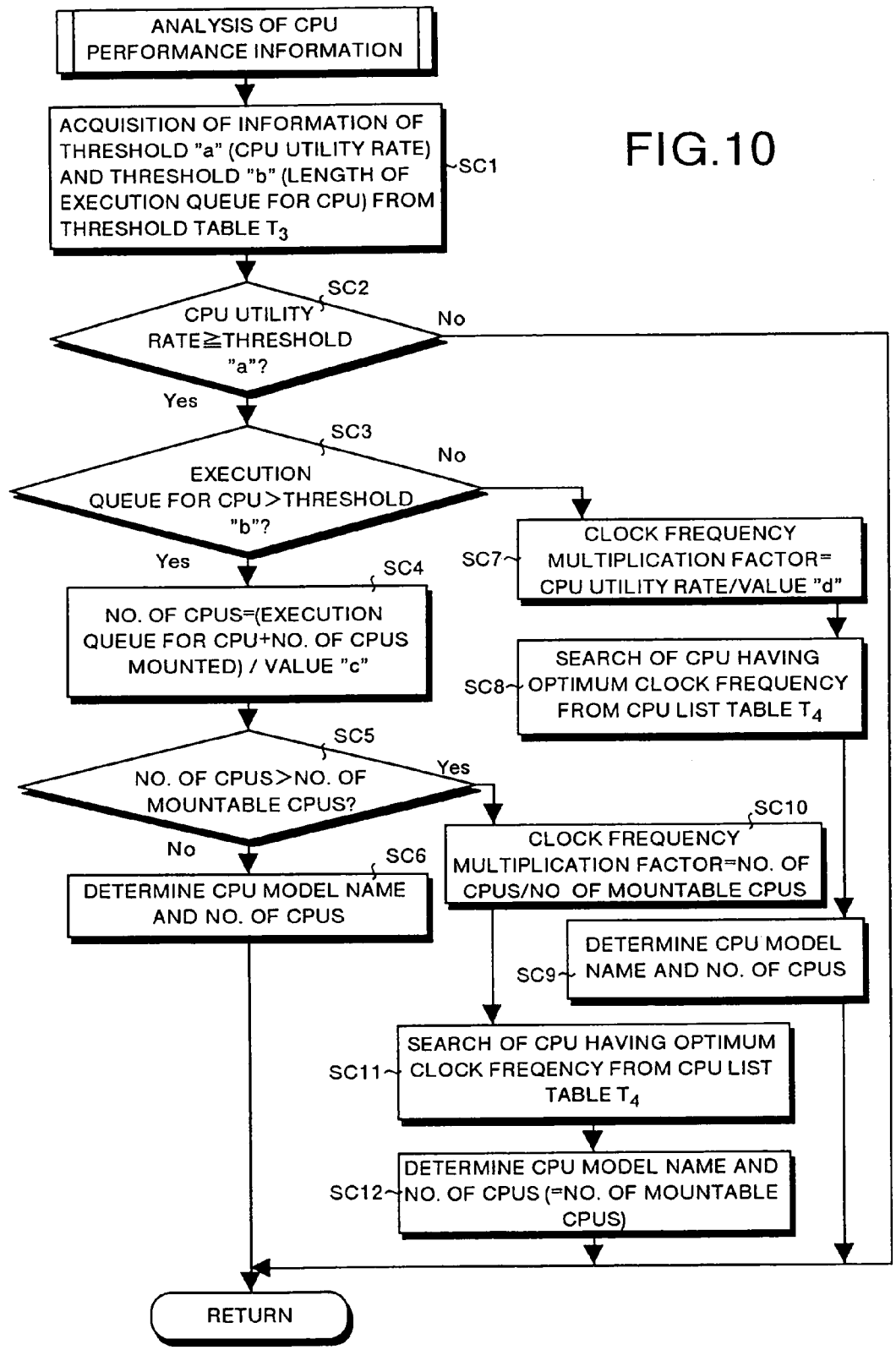
FIG. 10 is a flowchart for explaining the analysis process of CPU performance information shown in FIG. 8.

At step SA2 shown in FIG. 8, the analysis unit 25 executes CPU performance information analysis process (see FIG. 10). That is, at step SC1 shown in FIG. 10, the analysis unit 25 accesses the memory unit 22 and acquires the threshold "a" about the CPU utility rate and threshold "b" about the execution queue for the CPU from the threshold table $T_3$ shown in FIG. 7B and advances to step SC2.

At step SC2, the analysis unit 25 judges whether the CPU utility rate included in the system performance information $J_1$ shown in FIG. 5 is above the threshold "a" or not (see FIG. 7B). In this case, the CPU utility rate is the value about the CPU (=SPII) mounted on the computer having the machine id of A shown in FIG. 6. The CPU utility rate of this CPU is the average of the CPU utility rate measured from 10:00:00 to 12:10:00 shown in FIG. 5 (=84%).

Herein, when the CPU utility rate (=84%) is smaller than the threshold "a", the analysis unit 25 judges "No" at step SC2 and the process returns to the main routine shown in FIG. 8. In this case, this CPU (=SPII, see FIG. 6) is performing as specified and it is judged that there is no need to upgrade. Thereafter, the analysis unit 25 similarly executes CPU performance information analysis process about the CPUs corresponding to B to D (machine ID) shown in FIG. 6.

That is, in the case of the CPU (=PTT) corresponding to B (machine ID) shown in FIG. 6, at step SC2 shown in FIG. 10, the analysis unit 25 judges whether the corresponding CPU utility rate included in the system performance information $J_1$ is over the threshold "a" or not. In this case if the CPU utility rate is over the threshold "a", the analysis unit 25 judges "Yes" at step SC2 and advances to step SC3.

At step SC3, the analysis unit 25 judges whether the execution queue for the CPU relating to the CPU corresponding to B (machine ID) is longer than the threshold "b" or not (see FIG. 7B). In this case, if the execution queue for the CPU is longer than the threshold "b", the analysis unit 25 judges "Yes" at step SC3 and advances to step SC4. That is, with this CPU there is a problem that the CPU utility rate is more than the threshold "a" and the execution queue for the CPU is longer than the threshold "b". This problem can be solved by adding (extending) the CPU having the same clock frequency as this CPU.

At step SC4, the analysis unit 25 determines the result of dividing the sum of the execution queue for the CPU concerning this CPU (=PTT) and number of CPUs mounted by the value "c" as the number of CPUs (for example, 2.5) and advances to step SC5. This number of CPU is the number of CPUs necessary for exhibiting the specified performance. At step SC5, the analysis unit 25 judges if the number of CPUs (2.5) determined at step SC4 is greater than the number of mountable CPUs (4) corresponding to B (machine ID) shown in FIG. 6.

In this case, the analysis unit 25 judges "No" at step SC4 and advances to step SC6. At step SC6, the analysis unit 25 determines the CPU model name and number of CPUs relating to the CPU after upgrading. More specifically, the analysis unit 25 determines the model name of the CPU after upgrading as the same PTT (see FIG. 6) as the model name of the CPU already mounted. Also, the analysis unit 25 determines the number of CPUs by rounding up the number of CPUs (2.5) determined at step SC4 to 3.

On the other hand, if judged "Yes" at step SC5, the analysis unit 25 advances to step SC10. In this case, since the number of CPUs after upgrading is over the number of mountable CPUs, all the CPUs cannot be mounted on this computer. Therefore, at step SC10 to step SC12, by using the CPU having higher clock frequency than the clock frequency of the existing CPU, the process is executed to decrease the number of CPUs necessary for upgrading.

That is, at step SC10, the analysis unit 25 determines the clock frequency multiplication factor by dividing the number of CPUs determined at step SC4 by the number of mountable CPUs (see FIG. 6) and advances to step SC11. This clock frequency multiplication factor is the ratio of the clock frequency necessary for exhibiting the specified performance by using the CPUs within the number of mountable CPUs and the clock frequency of this CPU already mounted.

At step SC11, the analysis unit 25 searches the CPU having an optimum clock frequency from the CPU list table $T_4$ shown in FIG. 7C and advances to step SC12. Specifically, the analysis unit 25 determines the product of the clock frequency of the existing CPU and the clock frequency multiplication factor determined at step SC10 as the clock frequency of the CPU after upgrading.

Consequently, the analysis unit 25 searches the CPU of which clock frequency is higher than this clock frequency and closest to this clock frequency from the CPU list table $T_4$ and advances to step SC12. For example, when the clock frequency of the CPU after upgrading is determined as 242 MHz, the CPU of model name ZZ1 assigned with No. 4 shown in FIG. 7C is searched as the CPU after upgrading.

At step SC12, the analysis unit 25 determines the CPU model name about the CPU after upgrading and the number of CPUs. Specifically, the analysis unit 25 determines the CPU model name of the CPU after upgrading as ZZ1 (see FIG. 7C). The analysis unit 25 also determines the number of mountable CPUs as the number of CPUs.

In the case of the CPU (=ZZ2) corresponding to C (machine ID) shown in FIG. 6, at step SC2, the analysis unit 25 judges if this CPU utility rate included in the system performance information $J_1$ is over the threshold "a" or not. In this case, supposing that the CPU utility rate is over the threshold "a", the analysis unit 25 judges "Yes" at step SC2 and advances to step SC3.

At step SC3, the analysis unit 25 judges if the execution queue for the CPU relating to the CPU corresponding to C (machine ID) is longer than the threshold "b" or not (see FIG. 7B). In this case, supposing the execution queue for the CPU is shorter than the threshold "b", the analysis unit 25 judges "No" at step SC3 and advances to step SC7. That is, with this CPU, the problem is that the CPU utility rate is greater than the threshold "a". This problem can be solved by replacing this CPU with the CPU of higher clock frequency.

At step SC7, the analysis unit 25 determines the clock frequency multiplication factor by dividing the CPU utility rate of this CPU by the threshold "d" (<1) and advances to step SC8. This clock frequency multiplication factor is the ratio of the clock frequency of the CPU necessary for exhibiting the specified performance and the clock frequency of this CPU already mounted.

At step SC8, the analysis unit 25 searches the CPU having an optimum clock frequency from the CPU list table $T_4$ shown in FIG. 7C and advances to step SC9. Specifically, the analysis unit 25 determines the product of the clock frequency of the existing CPU and the clock frequency multiplication factor determined at step SC7 as the clock frequency of the CPU after upgrading.

Consequently, the analysis unit 25 searches the CPU of which clock frequency is higher than this clock frequency and closest to this clock frequency from the CPU list table $T_4$ shown in FIG. 7C and advances to step SC9. For example, when the clock frequency of the CPU after upgrading is determined as 452 MHz, the CPU of CPU model name ZZ3 assigned with No. 6 shown in FIG. 7C is searched as the CPU after upgrading.

At step SC9, the analysis unit 25 determines the CPU model name about the CPU after upgrading and the number of CPUs. Specifically, the analysis unit 25 determines the CPU model name of the CPU after upgrading as ZZ3 (see FIG. 7C). The analysis unit 25 also determines the number of mountable CPUs (2) corresponding to C (machine ID) shown in FIG. 6 as the number of CPUs.

In the case of the CPU (=AM2) corresponding to D (machine ID) shown in FIG. 6, at step SC2, the analysis unit 25 judges if this CPU utility rate included in the system performance information $J_1$ is over the threshold "a" or not. In this case, supposing that the CPU utility rate is below the threshold "a", the analysis unit 25 judges "No" at step SC2 and returns to the main routine shown in FIG. 8.

Figure 11:
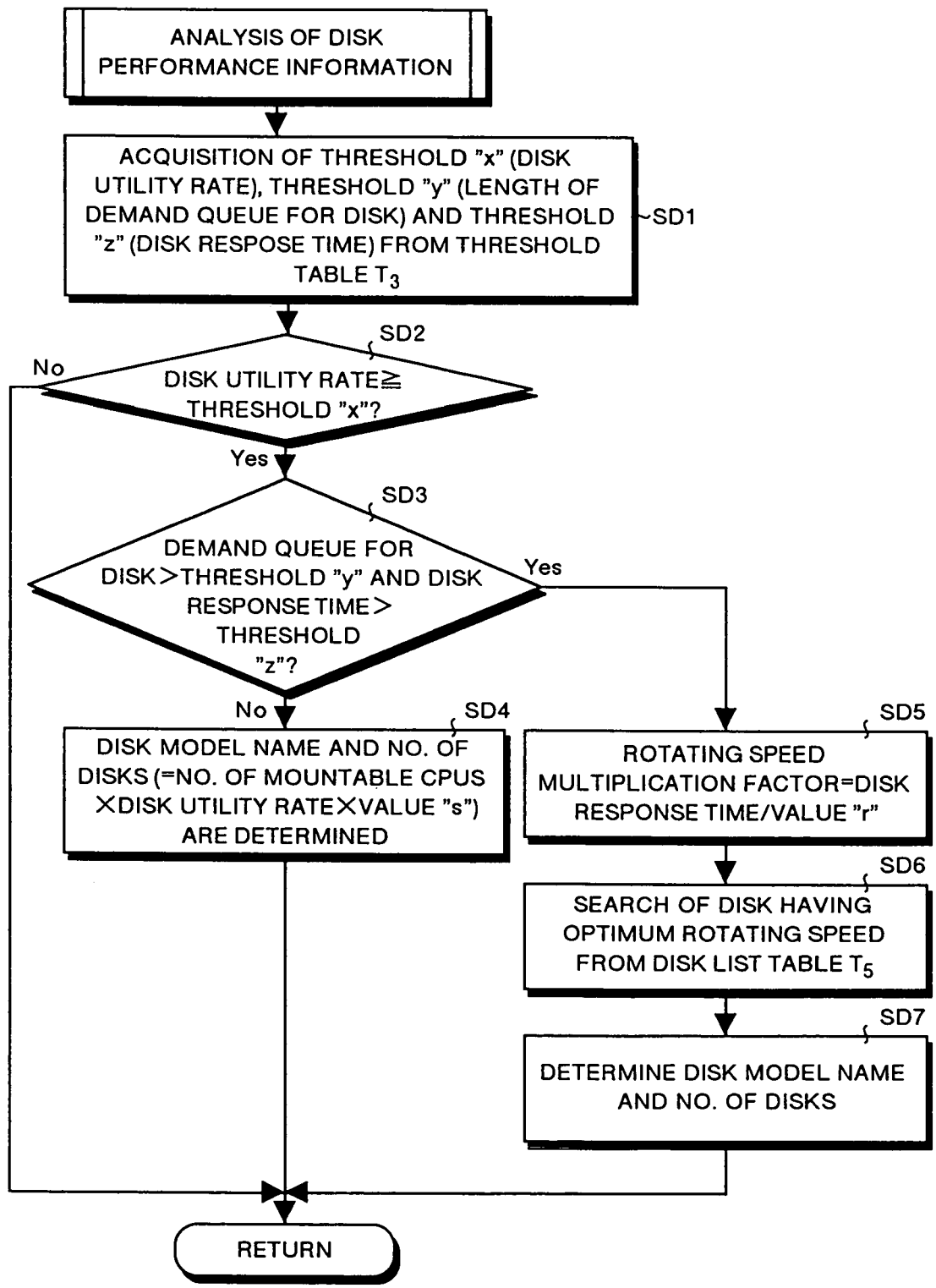
FIG. 11 is a flowchart for explaining the analysis process of disk performance information shown in FIG. 8.

Returning to FIG. 8, at step SA3, the analysis unit 25 executes disk performance information analysis process (see FIG. 11). That is, at step SD1 shown in FIG. 11, the analysis unit 25 accesses the memory unit 22 and acquires the threshold "x" about the disk utility rate, threshold "y" about the demand queue for the disk and threshold "z" about the disk response time from the threshold table $T_3$ shown in FIG. 7B and advances to step SD2.

At step SD2, the analysis unit 25 judges if the disk utility rate included in the system performance information $J_1$ shown in FIG. 5 is over the threshold "x" or not (see FIG. 7B). In this case, the disk utility rate is the value about the disk (SG2) mounted on the computer assigned with machine ID of A shown in FIG. 6. The disk utility rate of this disk is the average (43%) of the disk utility rate measured from 10:00:00 to 12:10:00 shown in FIG. 5.

Herein, if the disk utility rate is over the threshold "x", the analysis unit 25 judges "Yes" at step SD2 and advances to step SD3. At step SD3, the analysis unit 25 judges if the demand queue for the disk relating to the disk corresponding to A (machine ID) (see FIG. 5) is shorter than the threshold "y" (see FIG. 7B) and if the disk response time (see FIG. 5) is longer than the threshold "z" (see FIG. 7B).

In this case, if the demand queue for the disk is longer than the threshold "y" and the disk response time is longer than the threshold "z", the analysis unit 25 judges "No" at step SD3 and advances to step SD4. That is, with the disk, the problems are that the disk utility is greater than threshold "x", the demand queue for disk is longer than the threshold "y" and the disk response time is longer than the threshold "z". All of these problems can be solved by adding (extending) the disk having the same rotating speed as this disk.

At step SD4, the analysis unit 25 first determines the product of the number of disks mounted (=1, see FIG. 6) about this disk (SG2), the disk utility rate (=43%, see FIG. 5) and the value "s" as the number of disks (for example, 1.6). This number of disks (=1.6) is the number of disks required for exhibiting the specified performance.

Next, the analysis unit 25 determines the number of disks by rounding up the number of disks (1.6) to 2 and determines the disk model name after upgrading as SG2 (see FIG. 6) same as the disk model name already mounted. Thereafter, the analysis unit 25 execute the disk performance information analysis process about the disks corresponding to B to D (machine ID) shown in FIG. 6.

That is, in the case of the disk (AL2) corresponding to B (machine ID) shown in FIG. 6, at step SD2, the analysis unit 25 judges if the disk utility rate about this disk is more than the threshold "x" or not (see FIG. 7B). In this case, since the utility rate is smaller than the threshold "x", the analysis unit 25 judges "No" at step SD2 and returns to the main routine shown in FIG. 8.

In the case of the disk (SG5) corresponding to C (machine ID) shown in FIG. 6, at step SD2, if the disk utility rate about this disk is more than the threshold "x", the analysis unit 25 judges "Yes" and advances to step SD3. At step SD3, the analysis unit 25 judges if the demand queue for the disk about the disk corresponding to C (machine ID) is shorter than the threshold "y" (see FIG. 7B) and if the disk response time is longer than the threshold "z" (see FIG. 7B).

In this case, if the demand queue for disk is longer than threshold "y" and the disk response time is longer than the threshold "z", the analysis unit 25 judges "No" at step SD3 and advances to step SD4. That is, concerning this disk, the problems are that the disk utility rate is more than the threshold "x", that the demand queue for the disk is longer than the threshold "y" and that the disk response time is longer than the threshold "z". These problems can be solved by adding (extending) the disk having the same rotating speed as this disk.

At step SD4, the analysis unit 25 determines the product of the number of disks mounted (=5, see FIG. 6) about this disk (SGS), the disk utility rate and value "s" as the number of disks (for example, 6.5). This number of disks (6.5) is the number of disks necessary for exhibiting the specified performance.

Next, the analysis unit 25 determines the number of disks by rounding up the number of disks (6.5) to 7 and determines the disk model name after upgrading as SGS (see FIG. 6), same as the disk model name already mounted.

In the case of the disk (SG1) corresponding to D (machine ID) shown in FIG. 6, at step SD2, if the disk utility rate of this disk is more than the threshold "x", the analysis unit 25 judges "Yes" and advances to step SD3. At step SD3, the analysis unit 25 judges if the demand queue for the disk concerning the disk corresponding to D (machine ID) is shorter than the threshold "y" (see FIG. 7B) and if the disk response time is longer than the threshold "z" (See FIG. 7B).

In this case, if the demand queue for the disk about this disk is shorter than the threshold "y" and the disk response time is longer than the threshold "z", the analysis unit 25 judges "Yes" at step SD3 and advances to step SD5. That is, concerning this disk, the problems are that the disk utility rate is greater than the threshold "x" and that the disk response time is longer than the threshold "z". These problems can be solved by replacing the existing disk with the disk having a higher rotating speed than the existing disk.

At step SD5, the analysis unit 25 determines the rotating speed multiplication factor by dividing the disk response time of this disk by value r (<1) and advances to step SD6. This rotating speed multiplication factor is the ratio of the rotating speed of the disk necessary for exhibiting the specified performance and the rotating speed of this disk already mounted. The values c, d, s and r are decided by experience.

At step SD6, the analysis unit 25 searches the disk having an optimum rotating speed from the disk list table $T_5$ shown in FIG. 7D and advances to step SD7. Specifically, the analysis unit 25 determines the product of the rotating speed of the existing disk and the rotating speed multiplication factor determined at step SD5 as the rotating speed of the disk after upgrading.

Consequently, the analysis unit 25 searches the disk of which rotating speed is higher than this rotating speed and closest to this rotating speed from the disk list table $T_5$ shown in FIG. 7D and advances to step SD7. For example, when the rotating speed of the disk after upgrading is determined as 7100 rpm, the disk of model name AL2 assigned with No. 3 shown in FIG. 7D is searched as the disk after upgrading.

At step SD7, the analysis unit 25 determines the disk model name about the disk after upgrading and the number of disks. Specifically, the analysis unit 25 determines the disk model name of the disk after upgrading as AL2 (see FIG. 7D). The analysis unit 25 also determines the number of disks as the number of disks (=2) shown in FIG. 6 and returns to the main routine shown in FIG. 8.

Returning to FIG. 8, at step SA4, the analysis unit 25 judges whether or not to recommend upgrading of the CPU depending on whether or not the CPU model name and number of CPUs are determined at step SC6, step SC9 or step SC12 shown in FIG. 10. Similarly, the analysis unit 25 judges whether or not to recommend upgrading of the disk depending on whether or not the disk model name and number of disks are determined at step SD4 or SD7 shown in FIG. 11.

In this case, since the CPU model name and number of CPUs and the disk model name and number of disks are determined, the analysis unit 25 judges "Yes" at step SA4. Incidentally, if judged "No" at step SA4, the analysis unit 25 terminates the series of processing assuming there is no system resource (CPU, disk) recommended to be upgraded.

Figure 12:
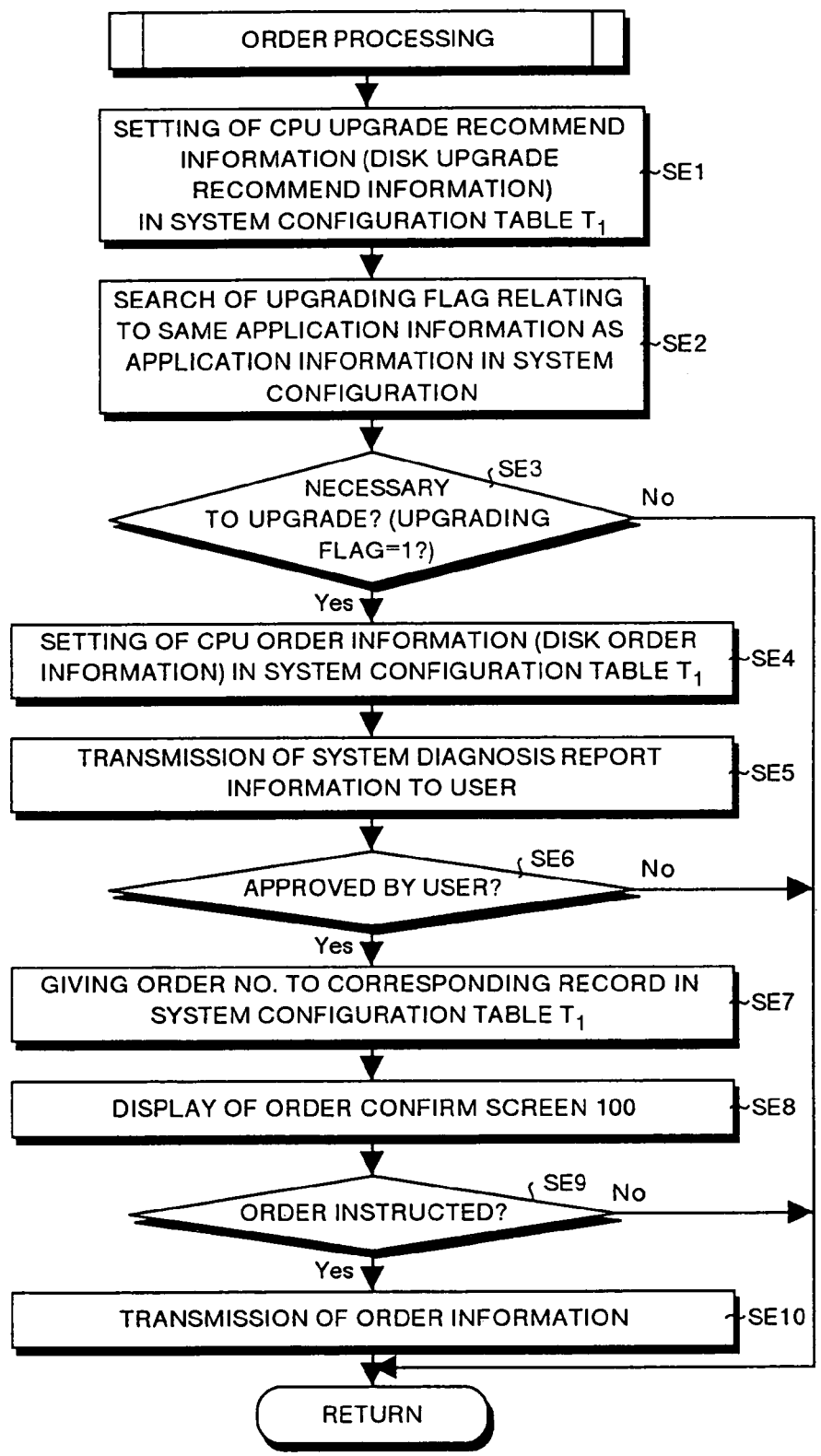
FIG. 12 is a flowchart for explaining the ordering process shown in FIG. 8.

At the next step SA5, the order processing unit 26 executes order processing (see FIG. 12). That is, at step SE1 shown in FIG. 12, the order processing unit 26 accesses the memory unit 21 and sets the CPU upgrade recommended information (disk upgrade recommended information) in the system configuration table $T_1$ shown in FIG. 6.

In this case, the order processing unit 26 sets PTT, ZZ3 and PTT as the CPU model names of the CPU upgrade recommended information, relating to B, C and D (machine ID) in the system configuration table $T_1$. Similarly, the order processing unit 26 sets 3, 2 and 1 as the number of CPUs in the CPU upgrade recommended information in the system configuration table $T_1$, relating to B, C and D (machine ID) in the system configuration table $T_1$.

Moreover, the order processing unit 26 sets SG2, SGS and AL2 as the disk model names of the disk upgrade recommended information in the system configuration table $T_1$, relating to A, C and D (machine ID) in the system configuration table $T_1$. Similarly, the order processing unit 26 sets 2, 7 and 2 as the number of disks in the disk upgrade recommended information in the system configuration table $T_1$, relating to A, C and D (machine ID) in the system configuration table $T_1$ and then advances to step SE2.

At step SE2, the order processing unit 26 accesses the memory unit 21 and searches the upgrading flag relating to the same application information as the application information shown in FIG. 6, from the application definition table $T_2$ shown in FIG. 7A. In this case, the order processing unit 26 recognizes the application information "mail server" in the record of A (machine ID) shown in FIG. 6. Next, the order processing unit 26 searches the upgrading flag (=1) corresponding to the application information "mail server" in the application definition table $T_2$ shown in FIG. 7A same as the aforesaid application information "mail server."

Similarly, thereafter, the order processing unit 26 searches the upgrading flag (=1, 1 and 0) about the application information "printer server," "job server," and "personal terminal" shown in FIG. 6, from the application definition table $T_2$ shown in FIG. 7A and advances to step SE3. At step SE3, the order processing unit 26 judges if necessary to upgrade or not, about the system resources of the computer (CPU, disk), on the basis of the retrieval result at step SE2.

In this case, concerning the mail server, printer server and job server (see application information) shown in FIG. 6, since the upgrading flag (see FIG. 7A) is 1 in all of them, the order processing unit 26 judges "Yes" at step SE3 and advances to step SE4. At step SE4, the order processing unit 26 sets the CPU order information and disk order information in the system configuration table $T_1$ on the basis of the CPU upgrade recommended information, disk upgrade recommended information and upgrading flag shown in FIG. 6 and advances to step SE6.

In this case, first, since the upgrading flag is 1 (see FIG. 7A) as for the mail server (application information) shown in FIG. 6, the order processing unit 26 sets SG2 (disk model name) of the disk upgrade recommended information in the disk model name of the disk order information. Also, the order processing unit 26, concerning the mail server shown in FIG. 6, sets the result (=1) of subtracting the number of disks mounted (=1) in the mounted disk information from the number of disks (=2) in the disk upgrade recommended information in the number of disks ordered in the disk order information.

Similarly, since the upgrading flag is 1 (see FIG. 7A) as for the printer server (application information) shown in FIG. 6, the order processing unit 26 sets PTT (CPU model name) of the CPU upgrade recommended information in the CPU model name of the CPU order information. Also, the order processing unit 26, concerning the printer server shown in FIG. 6, sets the result (=1) of subtracting the number of CPUs mounted (=2) in the mounted CPU information from the number of CPUs (=3) in the CPU upgrade recommended information in the CPU order quantity in the CPU order information.

Also, since the upgrading flag is 1 (see FIG. 7A) as for the job server (application information) shown in FIG. 6, the order processing unit 26 sets ZZ3 (CPU model name) of the CPU upgrade recommended information in the CPU model name of the CPU order information. Also, the order processing unit 26, concerning the job server shown in FIG. 6, sets the number of CPUs (=2) in the CPU upgrade recommended information in the number of CPUs ordered in the CPU order information.

Moreover, concerning the job server, the order processing unit 26 sets SGS (disk model name) of the disk upgrade recommended information in the disk model name of the disk order information. Further, the order processing unit 26, concerning the job server shown in FIG. 6, sets the result (=2) of subtracting the number of disks mounted (=5) in the mounted disk information from the number of disks (=7) in the disk upgrade recommended information in the number of disks ordered in the disk order information.

Concerning the individual information (application information) shown in FIG. 6, since the upgrading flag is 0 (see FIG. 7A), the order processing unit 26 does not set the CPU order information and disk order information although upgrading of CPU and disk is recommended. In this case, that is, the CPU and disk of the personal terminal are not updated by the judgement of the user.

At step SE5, the order processing unit 26 compiles the system diagnosis report in the computer unit on the basis of the performance diagnosis result of the system resources in the user system 10 and transmits the information of this system diagnosis report to the user system 10 (user) through the communication processing unit 32 and network N and advances to step SE6. This system diagnosis information includes the date of diagnosis, system resources of computers, results of system diagnosis, problems, countermeasures and other information.

Figure 14:
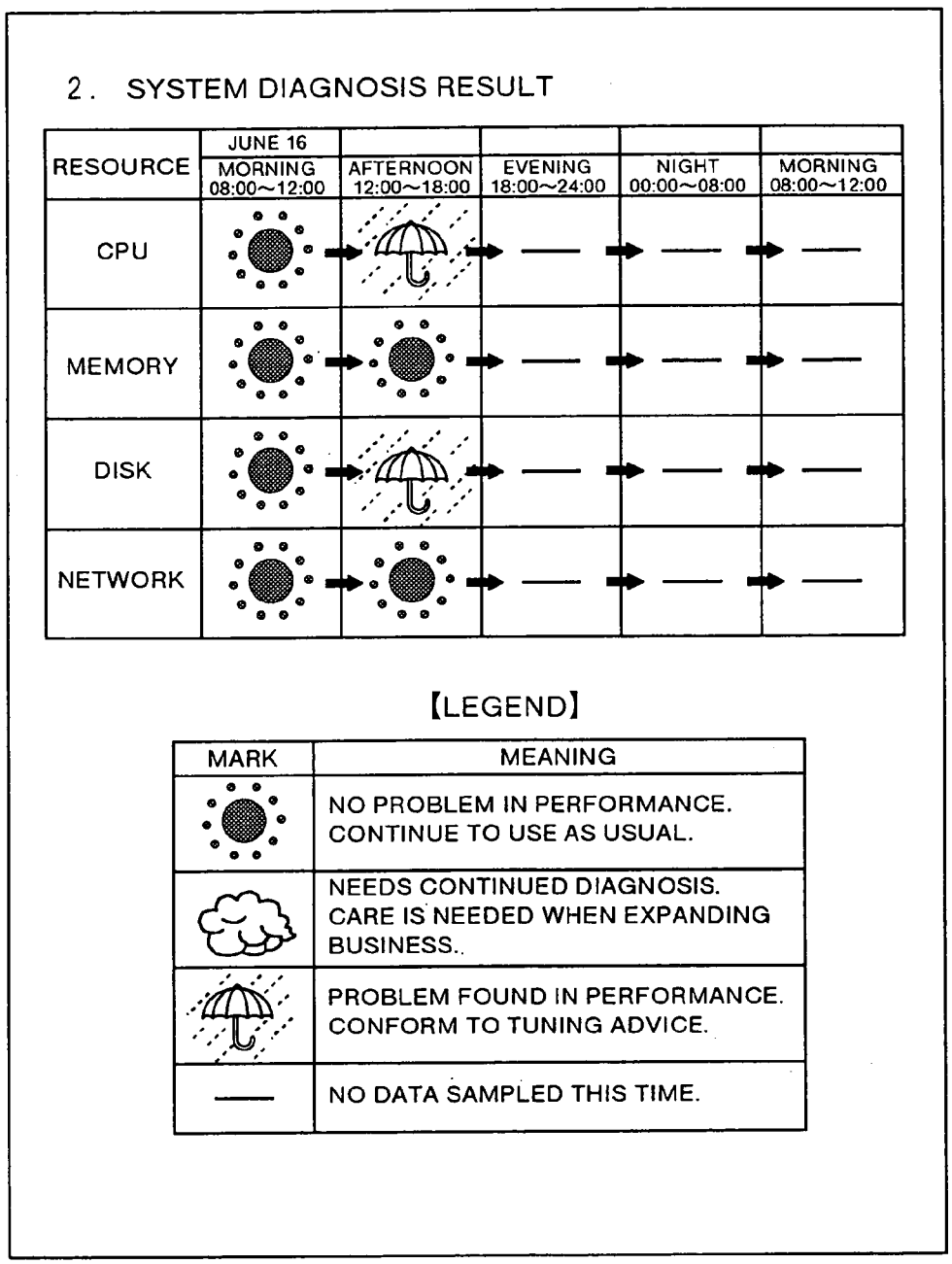
FIG. 14 is a diagram showing an example of system diagnosis report in this embodiment.

FIG. 13 to FIG. 15 are diagrams showing examples of system diagnosis report about the job server (application information) shown in FIG. 6 that makes the user system 10. In FIG. 13, "1. System diagnosis subject" consists of Customer name, Date of diagnosis, Hardware and Software. In the item of Hardware, ZZ2 is described as the CPU (CPU model name in FIG. 6) and 5 is given as the number of disks (number of disks mounted in FIG. 6).

In FIG. 14, "2. System diagnosis result" shows the system diagnosis result in each time zone (morning, afternoon, evening, night) about each resource (CPU, memory, disk and network), by weather marks, sunny, cloudy and rain. The sunny mark means there is no problem in performance and the cloudy mark indicates it is necessary to diagnose continuously. The rain mark means there is a problem in performance. In the example shown in FIG. 14, in the CPU and disk, rain marks are indicated in the time zone of 12:00 to 18:00 and there are problems in performance.

In FIG. 15, "3. Problem and tuning advice" describes problems and tuning advice (countermeasure) of each resource (CPU, memory, disk and network). Herein, the smile mark means there is no problem.

In the example shown in FIG. 15, concerning the CPU, the high CPU utility rate is indicated as a problem and upgrading of clock speed (from 400 MHz to 500 MHz) of the CPU is recommended as the tuning advice. Concerning the disk, the high load of the disk due to paging is indicated as a problem and it is recommended to add two disks.

Returning to FIG. 12, at step SE6, the order processing unit 26 judges if the user has approved the upgrading or not. When the information of the system diagnosis report is received in the user system 10, the user system 10 displays the system diagnosis report in the display unit (not shown), or prints it out. Accordingly, the user of the user system 10 judges whether or not to upgrade as recommended by the maintenance firm according to the content of the system diagnosis report.

The user manipulates the user system 10 and transmits the reply about upgrading to the system diagnosis apparatus 20 through the network N. When this reply information is received in the communication processing unit 32, the order processing unit 26 judges whether the upgrading is approved by the user or not and, if not approved, judges "No" and terminates the series of processing.

When approved by the user, the order processing unit 26 judges "Yes" at step SE6 and advances to step SE7. At step SE7, the order processing unit 26 assigns the records out of the records in the system configuration table $T_1$ (in this case, records A, B and C=machine ID) shown in FIG. 6 with order number, for example, JJ1999080512 (see FIG. 16). The order processing unit 26 notices the order number by e-mail or the like to the computer terminals (not shown) of the sales person and maintenance person in charge of the user of the user system 10 and advances to step SE8.

At step SE8, the order processing unit 26 displays an order confirm screen 100 shown in FIG. 16 on the display unit 29 and advances to step SE9. This order confirm screen 100 is a screen for ordering the system resources approved by the user to the factor/parts center system 40. In this illustrated example, the order confirm screen 100 includes the order number given at step SE7 (JJ1999080512), CPU model name (PTT, ZZ3), quantity (1, 2), disk model name (SG2, SGS) and quantity (1, 2).

Herein, the CPU model name and quantity correspond to the CPU model name and number of CPUs ordered in the CPU order information shown in FIG. 6. Similarly, the disk model name and quantity correspond to the disk model name and number of disks ordered in the disk order information shown in FIG. 6. The order confirm screen 100 also shows a soft button 101 for instructing the order and a soft button 102 for canceling the order.

At step SE9, the order processing unit 26 judges if the order instruction of the system resources (CPU, disk) is issued by the person in charge at the maintenance firm. Specifically, the order processing unit 26 judges if the soft button 101 of the order confirm screen 100 shown in FIG. 16 is pressed or not.

When the soft button 101 is pressed by the person in charge who has confirmed the order confirm screen 100 by using the input unit 28, the order processing unit 26 judges "Yes" at step SE9 and advances to step SE10. When the soft button 102 of the order confirm screen 100 is pressed, the order processing unit 26 judges "No" at step SE9 and terminates the series of processing without ordering system resources.

In this case, at step SE10, the order processing unit 26 transmits the order information about the CPU and disk composed of order number, CPU model name, quantity, disk model name and quantity in the order confirm screen 100 shown in FIG. 16 to the factory/parts center system 40 through the communication processing unit 32 and network N.

When the order information is received in the factory/parts center system 40, the order information is displayed in the display unit (not shown) of the factory/parts center system 40. As a result, the CPU and disk for upgrading are delivered to the user from the factory/parts center. The person in charge at the maintenance firm installs the delivered system resources (CPU, disk) in the mail server, printer server and job server in the user system 10. Thus, the system resources are upgraded.

As explained herein, according to this embodiment, the system resources are diagnosed on the basis of the CPU utility rate about the system resources (CPU, disk), execution queue for the CPU, disk utility rate, demand queue for the disk, response time and the corresponding threshold "a", threshold "b", threshold "x", threshold "y" and threshold "z" (see FIG. 7B) and results of comparison between them and therefore measures against lowering of performance of system resources or shortage of system resources can be carried out accurately and quickly.

Further, since system resources are ordered from the factory/parts center system 40 through the network N by using the order processing unit 26 on the basis of the results of analysis by the analysis unit 25, system resources can be ordered quickly and accurately.

Further, the information of the system diagnosis report (see FIG. 13 to FIG. 15) about the user system 10 is noticed to the user through the network N, the time from request of diagnosis till reporting of the result of diagnosis to the user is shortened, so that the quality of customer service can be enhanced.

Further, on the basis of the upgrading flag shown in FIG. 7A, of the system resources recommended to be upgraded, only the system resources required to be upgraded can be ordered as the system resources for upgrading, so that the user's judgement whether or not to upgrade is quickly applied in ordering.

The embodiment of the present invention has been described in detail while referring to the accompanying drawings, but specific examples of constitution are not limited to this embodiment alone and changes and modifications within the scope of the present invention are also included in the present invention. For example, in this embodiment, the system diagnosis program for realizing the function of the system diagnosis apparatus 20 may be recorded in a computer-recordable recording medium 300 shown in FIG. 17 and the system diagnosis program recorded in this recording medium 300 may be read into a computer 200 shown in the diagram and executed, so that the resources (CPU, disk, etc.) can be diagnoses.

Figure 17:
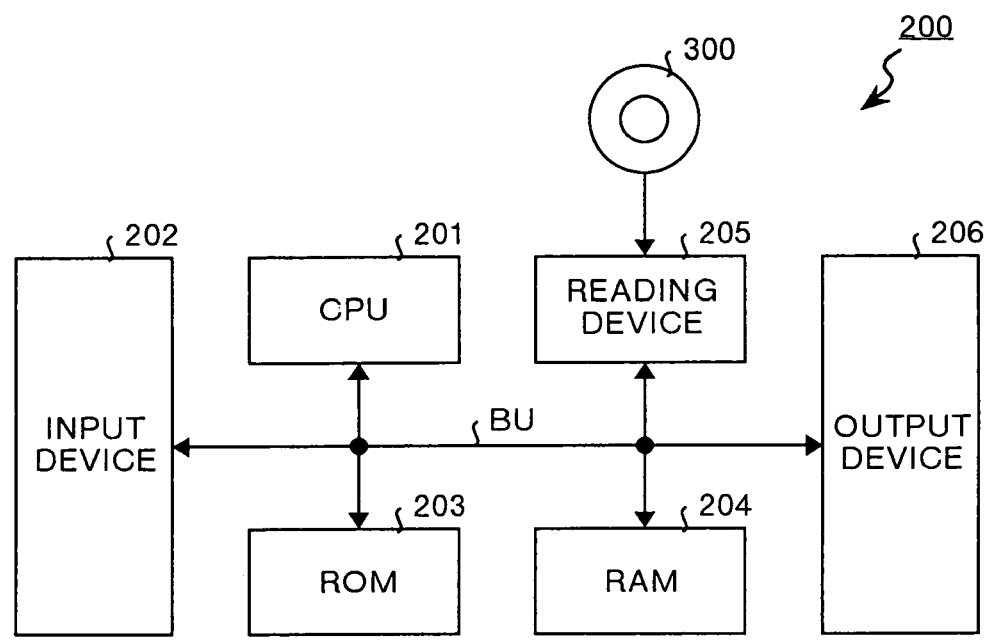
FIG. 17 is a block diagram showing a modified example of this embodiment.

The computer 200 shown in FIG. 17 comprises CPU 201 for executing this system diagnosis program, input device 202 such as keyboard and mouse, read-only memory (ROM) 203 for storing data, random access memory (RAM) 204 for storing operation parameters, reading unit 205 for reading the system diagnosis program from the recording medium 300, output device 206 such as display and printer and buses BU for connecting the device parts.

The CPU 201 reads in the system diagnosis program recorded in the recording medium 300 through the reading unit 205 and executes the system diagnosis program and thereby diagnoses the system resources. The recording medium 300 includes not only portable recording media such as optical disk, floppy disk and hard disk, but also includes a transfer medium for recording and hold data temporarily such as network.

In the embodiment, the information of the system diagnosis report is transmitted to the user system 10 through the network N, but not limited to this, the system diagnosis report may be printed out by the printer 33 and it may be sent to the user by facsimile or mail, or directly brought to the user.

In the embodiment, the information about whether or not to upgrade is transmitted to the system diagnosis apparatus 20 from the user system 10 through the network N, but not limited to this, the reply of upgrading or not may be reported to the maintenance firm by telephone, facsimile or the like. In this case, the person in charge receiving the reply from the user enters the information about upgrading by using the input unit 28. As a result, the order processing unit 26 executes the process after step SE6 shown in FIG. 12.

Further, in the embodiment, it is designed to diagnose by using the average values of the CPU utility rate, execution queue for the CPU, disk utility rate, demand queue for the disk and disk response time shown in FIG. 5, but it may be also diagnosed by using, for example, the maximum values of the CPU utility rate, execution queue for the CPU, disk utility rate, demand queue for the disk and disk response time in the system performance information $J_1$.

In addition, in the embodiment, the system diagnosis report (see FIG. 13 to FIG. 15) is presented to the user and system resources are ordered after obtaining the final approval by the user about upgrading of system resources, but system resources may be ordered only on the basis of the upgrading flag of the application definition table $T_2$ (see FIG. 7A). That is, as for the system resources of which upgrading flag is 1 in the application definition table $T_2$, they are ordered automatically without obtaining the final approval of the user. In this case, the order processing is done quickly.

According to one aspect of this invention, the system resources are diagnosed on the basis of the results of comparison between the utility rate and its threshold and between the queue and its threshold. Therefore, measures against performance drop of system resources or shortage of system resources can be executed accurately and quickly.

Further, the system resources for upgrading are ordered by the ordering unit on the basis of the result of determination by the system resource determining unit. Therefore, the system resources can be ordered quickly and accurately.

Further, the ordering unit directly transmits the ordering information about the system resources for updating to the device of the supplier's side through the network. Therefore, the system resources can be ordered more quickly and accurately.

Further, the result of diagnosis by the diagnosis unit is noticed to the user through the network. Therefore, the time from request of diagnosis till report of diagnosis result to the user is shortened and the quality of customer service is enhanced.

Further, out of the system resources determined by the system resource determining unit only the system resources required to be updated are ordered as the system resources for upgrading on the basis of the flag. Therefore, the user's judgement whether upgrading is required or not can be promptly fed back to the ordering.

Further, the system resources are diagnosed on the basis of the results of comparison between the utility rate and its threshold, comparison between the queue and its and further comparison between the response time and its threshold. Therefore, the system resources can be diagnosed more accurately.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A system diagnosis apparatus that diagnoses system resources of a computer system, comprising:
    an acquisition unit which acquires information on a utility rate of each system resource and a plurality of queues associated with the system resources, said queues each having a queue number being the number of programs, processes or demands waiting to be processed in each queue;
    a memory unit that stores both a threshold of the utility rate and a threshold of the queue number for each system resource, wherein the thresholds represent the limits at which said system resources perform desired performances; and
    a diagnosis unit that:
    diagnoses that the performance of a selected system resource has lowered when the utility rate is higher than the threshold of the utility rate and the queue number is less than the threshold of the queue number, wherein the diagnosis unit transmits, to the computer system, information including upgrade recommendation information for replacing said selected system resource that is diagnosed to have low performance with an upgraded system resource; and
    diagnoses that the number of the system resources is insufficient for said selected system resource when the utility rate is higher than the threshold of the utility rate and the queue number is greater than the threshold of the queue number, wherein the diagnosis unit transmits, to the computer system, information including upgrade recommendation information for adding to said selected system resource that is diagnosed to have low performance with an additional system resource;
    a system resource determining unit which determines a system resource capable of giving the desired performance when it is diagnosed by said diagnosis unit that the performance of the system resource has lowered, or determines a number of the system resources capable of giving the desired performance when it is diagnosed by said system diagnosis unit that the number of the system resources is insufficient; and
    an ordering unit which orders the system resource determined by said system resource determining unit as the system resource for upgrading.

2. The system diagnosis apparatus according to claim 1, wherein said ordering unit transmits, utilizing a network, the ordering information on the system resources to a device installed at the supplier of the system resources.

3. The system diagnosis apparatus according to claim 1, further comprising a notifying unit which notifies, utilizing a network, the result of diagnosis by said diagnosis unit to the user of the system.

4. A system diagnosis apparatus according to claim 1, wherein
    said memory unit stores in correlation to each of said system resource a flag indicating a necessity or not of an upgrade, which necessity is judged by a user, and
    said ordering unit orders only the system resources that have a flag indicating the necessity of the upgrade of the system resources as determined by said system resource determining unit.

5. The system diagnosis apparatus according to claim 1, wherein
    said acquisition unit acquires information on a response time of the system resources in addition to the utility rate and the queue number,
    said memory unit stores a threshold of the response time, which threshold represents the limit at which said system resource exhibits a desired performance, in addition to the thresholds of the utility rate and the queue number, and
    said diagnosis unit makes the diagnosis on the basis of the result of comparison between the acquired response time and the threshold of the response time.

6. A system diagnosis method for diagnosing system resources of a computer system, comprising the steps of:
    acquiring information on a utility rate of each system resource and a plurality of queues associated with the system resources, said queues each having a queue number being the number of programs, processes or demands waiting to be processed in each queue;
    storing both a threshold of the utility rate and a threshold of the queue number for each system resource, wherein the thresholds represent the limits at which said system resources perform desired performances;
    diagnosing that the performance of a selected system resource has lowered when the utility rate is higher than the threshold of the utility rate and the queue number is less than the threshold of the queue number, and transmitting, to the computer system, information including upgrade recommendation information for replacing said selected system resource that is diagnosed to have low performance;
    diagnosing that the number of the system resources is insufficient for said selected system resource when the utility rate is higher than the threshold of the utility rate and the queue number is greater than the threshold of the queue number and transmitting, to the computer system, information including upgrade recommendation information for adding to said selected system resource that is diagnosed to have low performance;
    determining a system resource capable of giving the desired performance when it is diagnosed that the performance of the system resource has lowered, or determining a number of the system resources capable of giving the desired performance when it is diagnosed that the number of the system resources is insufficient; and
    ordering the determined system resource as the system resource for upgrading.

7. A computer-readable recording medium recording a system diagnosis program for diagnosing system resources of a computer system, for causing the computer to execute the steps of:
- acquiring information on a utility rate of each system resource and a plurality of queues associated with the system resources, said queues each having a queue number being the number of programs, processes or demands waiting to be processed in each queue;
- storing both a threshold of the utility rate and a threshold of the queue number for each system resource, wherein the thresholds represent the limits at which said system resources perform desired performances;
- diagnosing that the performance of a selected system resource has lowered when the utility rate is higher than the threshold of the utility rate and the queue number is less than the threshold of the queue number and transmitting, to the computer system, information including upgrade recommendation information for replacing said selected system resource that is diagnosed to have low performance;
- diagnosing that the number of the system resources is insufficient for said selected system resource when the utility rate is higher than the threshold of the utility rate and the queue number is greater than the threshold of the queue number and transmitting, to the computer system, information including upgrade recommendation information for adding to said selected system resource that is diagnosed to have low performance;
- determining a system resource capable of giving the desired performance when it is diagnosed that the performance of the system resource has lowered, or determining a number of the system resources capable of giving the desired performance when it is diagnosed that the number of the system resources is insufficient; and
- ordering the determined system resource as the system resource for upgrading.

* * * * *

UNITED STATES PATENT AND TRADEMARK OFFICE
CERTIFICATE OF CORRECTION

PATENT NO. : 7,003,769 B1  Page 1 of 1
APPLICATION NO. : 09/496069
DATED : February 21, 2006
INVENTOR(S) : Ken Yoshimura et al.

It is certified that error appears in the above-identified patent and that said Letters Patent is hereby corrected as shown below:

On the title page; and column 1, line 1:

Under (54), delete "SYSTEM DIAGNOSIS APPARATUS, SYSTEM DIAGNOSIS METHOD AND COMPUTER-READABLE RECORDING MEDIUM RECORDING SYSTEM DISAGNOSIS PROGRAM" and insert -- SYSTEM DIAGNOSES OF RESOURCE PERFORMANCE WITH UPGRADE RECOMMENDATION INFORMATION BASED ON QUEUE NUMBER AND UTILITY RATE --

Signed and Sealed this

First Day of April, 2008

JON W. DUDAS
*Director of the United States Patent and Trademark Office*